US010944516B2

(12) United States Patent
Ozturk et al.

(10) Patent No.: US 10,944,516 B2
(45) Date of Patent: Mar. 9, 2021

(54) PERIODIC GRANTS FOR MULTIPLE TRANSMISSION TIME INTERVAL CONFIGURATIONS

(71) Applicant: QUALCOMM Incorporated, San Diego, CA (US)

(72) Inventors: Ozcan Ozturk, San Diego, CA (US); Arnaud Meylan, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 71 days.

(21) Appl. No.: 16/019,307

(22) Filed: Jun. 26, 2018

(65) Prior Publication Data

US 2019/0007176 A1  Jan. 3, 2019

Related U.S. Application Data

(60) Provisional application No. 62/527,791, filed on Jun. 30, 2017.

(51) Int. Cl.
*H04L 1/18* (2006.01)
*H04W 72/12* (2009.01)
*H04W 72/04* (2009.01)

(52) U.S. Cl.
CPC ............ *H04L 1/1887* (2013.01); *H04L 1/188* (2013.01); *H04L 1/1812* (2013.01);
(Continued)

(58) Field of Classification Search
CPC ............ H04W 72/14; H04W 72/1284; H04W 72/0413; H04W 72/0446; H04W 52/48;
(Continued)

(56) References Cited

U.S. PATENT DOCUMENTS

| 2007/0183451 A1* | 8/2007 | Lohr ................. H04L 1/1678 370/473 |
| 2016/0095137 A1* | 3/2016 | Chen ................. H04L 5/0007 370/329 |

(Continued)

FOREIGN PATENT DOCUMENTS

WO    WO-2017052706 A1    3/2017

OTHER PUBLICATIONS

Catt: "Discussion on Multiplexing of Normal TTI and sTTI in UL", 3GPP Draft; R1-1707429, 3rd Generation Partnership Project (3GPP), Mobile Competence Centre; 650, Route Des Lucioles; F-06921 Sophia-Antipolis Cedex; France, vol. RAN WG1, No. Hangzhou, China; 20170515-20170519 May 14, 2017, XP051272638, Retrieved from the Internet: URL:http://www.3gpp.org/ftp/Meetings_3GPP_SYNC/RAN1/Docs/ [retrieved on May 14, 2017], 6 pages.

(Continued)

*Primary Examiner* — Elton Williams
(74) *Attorney, Agent, or Firm* — Holland & Hart LLP

(57) ABSTRACT

Methods, systems, and devices for wireless communication are described. Semi-persistent scheduling (SPS) configurations that enable uplink transmissions during different transmission time intervals (TTIs) may be used. For example, a
(Continued)

base station may configure SPS for a set of TTIs, where the configuration may include a periodicity between shortened TTIs (sTTIs) (e.g., two-symbol, three-symbol, seven-symbol TTIs, etc.) that may be used by a user equipment (UE) for uplink transmissions. The base station may signal the SPS configuration to the UE, and the UE may then identify locations of TTIs for use in SPS transmissions. For instance, the UE may identify the location of a set of sTTIs that are designated for SPS and that occur at a certain periodicity indicated by the configuration. Upon identifying the TTI locations, the UE may transmit uplink data during one or more of the identified TTIs in accordance with the periodicity.

29 Claims, 19 Drawing Sheets

(52) U.S. Cl.
CPC .......... *H04L 1/1816* (2013.01); *H04L 1/1819* (2013.01); *H04L 1/1861* (2013.01); *H04W 72/1268* (2013.01); *H04W 72/1284* (2013.01); *H04W 72/042* (2013.01); *H04W 72/1242* (2013.01); *H04W 72/1289* (2013.01)

(58) Field of Classification Search
CPC ............. H04W 72/1215; H04L 1/1854; H04L 1/1861; H04L 1/1887; H04L 1/1816; H04L 1/1864; H04L 1/0018; H04L 1/1896; H04L 5/0055; H04L 5/0092
See application file for complete search history.

(56) References Cited

U.S. PATENT DOCUMENTS

| | | | |
|---|---|---|---|
| 2018/0242389 | A1* | 8/2018 | Phuyal ................ H04W 72/042 |
| 2019/0149273 | A1* | 5/2019 | Golitschek Edler von Elbwart ................ H04L 1/1864 714/748 |

OTHER PUBLICATIONS

Ericsson: "SPS Operation on sTTI", 3GPP Draft; [SHORTITI] R2-1705829—SPS Operation on STTI (Update), 3rd Generation Partnership Project (3GPP), Mobile Competence Centre; 650, Route Des Lucioles; F-06921 Sophia-Antipolis Cedex; France, vol. RAN WG2, No. Hangzhou; 20170515-20170519 May 12, 2017, XP051285678, Retrieved from the Internet: URL:http://www.3gpp.org/ftp/tsg_ran/WG2_RL2/TSGR2_98/Docs/ [retrieved on May 12, 2017], 4 pages.
International Search Report and Written Opinion—PCT/US2018/039703—ISA/EPO—dated Sep. 25, 2018.
LG Electronics Inc: "Semi-Persistent Scheduling in NR", 3GPP Draft; R2-1704496 Semi-Persistent Scheduling in NR, 3rd Generation Partnership Project (3GPP), Mobile Competence Centre; 650, Route Des Lucioles; F-06921 Sophia-Antipolis Cedex; France, vol. RAN WG1, No. Hangzhou, China; 20170515-20170519 May 14, 2017, XP051275059, Retrieved from the Internet: URL:http://www.3gpp.org/ftp/Meetings_3GPP_SYNC/RAN2/Docs/ [retrieved on May 14, 2017], 3 pages.

* cited by examiner

PERIODIC GRANTS FOR MULTIPLE TRANSMISSION TIME INTERVAL CONFIGURATIONS

CROSS REFERENCES

The present Application for patent claims benefit of U.S. Provisional Patent Application No. 62/527,791 by Ozturk et al., entitled "Periodic Grant For Multiple Transmission Time Interval Configurations," filed Jun. 30, 2017, assigned to the assignee hereof, and expressly incorporated by reference in its entirety.

BACKGROUND

The following relates generally to wireless communication, and more specifically to periodic grants for multiple transmission time interval configurations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some cases, a base station may provide a configured resource grant for uplink communications by a UE, where the grant is, for example, not dynamically received over a physical channel. For example, the base station may configure the UE for uplink transmissions using semi-persistent scheduling (SPS) by scheduling the UE to transmit uplink messages at a certain periodicity on reserved SPS resources. Additionally, the base station and UE may be configured to communicate using various transmission time intervals (TTIs) having different durations, such as, for example, a 1 millisecond (ms) TTI, a two-symbol TTI, a slot TTI, and the like.

SUMMARY

The described techniques relate to improved methods, systems, devices, or apparatuses that support periodic grants for multiple transmission time interval (TTI) configurations. Generally, the described techniques provide for uplink transmissions based on a configured resource grant (e.g., semi-persistent scheduling (SPS) configurations) that enable uplink transmissions during shortened TTIs (sTTIs). For example, a base station may configure SPS for a set of TTIs, where the configuration may include a periodicity between respective sTTIs (e.g., two-symbol, three-symbol, seven-symbol TTIs, etc.) used by a user equipment (UE) for uplink transmissions. The base station may signal the SPS configuration to the UE, and the UE may then identify locations of the respective TTIs for use in SPS transmissions. For instance, the UE may identify the location of a set of sTTIs that are designated for SPS and that occur at a certain periodicity established by the configuration. Upon identifying the TTI locations, the UE may transmit uplink data during one or more of the identified TTIs in accordance with the configuration. In some examples, the UE may send retransmissions of uplink data to the base station using the SPS configuration by utilizing a next available TTI based on the configuration.

A method of wireless communication is described. The method may include receiving a configuration for uplink transmissions, the configuration comprising a resource grant for respective TTIs designated for the uplink transmissions, identifying a first TTI in accordance with the configuration, the first TTI having a first duration, identifying, within the first TTI, a location of a second TTI in accordance with the configuration, the second TTI having a second duration that is shorter than the first duration, and transmitting uplink data based at least in part on the identified location.

An apparatus for wireless communication is described. The apparatus may include means for receiving a configuration for uplink transmissions, the configuration comprising a resource grant for respective TTIs designated for the uplink transmissions, means for identifying a first TTI in accordance with the configuration, the first TTI having a first duration, means for identifying, within the first TTI, a location of a second TTI in accordance with the configuration, the second TTI having a second duration that is shorter than the first duration, and means for transmitting uplink data based at least in part on the identified location.

Another apparatus for wireless communication is described. The apparatus may include a processor, memory in electronic communication with the processor, and instructions stored in the memory. The instructions may be operable to cause the processor to receive a configuration for uplink transmissions, the configuration comprising a resource grant for respective TTIs designated for the uplink transmissions, identify a first TTI in accordance with the configuration, the first TTI having a first duration, identify, within the first TTI, a location of a second TTI in accordance with the configuration, the second TTI having a second duration that is shorter than the first duration, and transmit uplink data based at least in part on the identified location.

A non-transitory computer readable medium for wireless communication is described. The non-transitory computer-readable medium may include instructions operable to cause a processor to receive a configuration for uplink transmissions, the configuration comprising a resource grant for respective TTIs designated for the uplink transmissions, identify a first TTI in accordance with the configuration, the first TTI having a first duration, identify, within the first TTI, a location of a second TTI in accordance with the configuration, the second TTI having a second duration that is shorter than the first duration, and transmit uplink data based at least in part on the identified location.

Some examples of the method, apparatus, and non-transitory computer-readable medium described above may further include processes, features, means, or instructions for receiving hybrid automatic repeat request (HARQ) feedback for the transmitted uplink data. Some examples of the method, apparatus, and non-transitory computer-readable medium described above may further include processes, features, means, or instructions for retransmitting the uplink data during a third TTI that follows the second TTI in accordance with the configuration, the retransmitting responsive to the received HARQ feedback.

In some examples of the method, apparatus, and non-transitory computer-readable medium described above, the uplink data may be retransmitted using a same redundancy version (RV) as the transmission of the uplink data in the second TTI. In some examples of the method, apparatus, and non-transitory computer-readable medium described above, the uplink data may be retransmitted using a predetermined incremental version.

Some examples of the method, apparatus, and non-transitory computer-readable medium described above may further include processes, features, means, or instructions for determining that a timer may have expired. Some examples of the method, apparatus, and non-transitory computer-readable medium described above may further include processes, features, means, or instructions for retransmitting the uplink data based at on the expiration of the timer.

Some examples of the method, apparatus, and non-transitory computer-readable medium described above may further include processes, features, means, or instructions for determining a priority associated with transmissions during the second TTI based at least in part on the received configuration. Some examples of the method, apparatus, and non-transitory computer-readable medium described above may further include processes, features, means, or instructions for identifying a collision between concurrent uplink transmissions, the concurrent uplink transmissions comprising the uplink data transmission during the second TTI and a second uplink data transmission during a third TTI having the first duration. Some examples of the method, apparatus, and non-transitory computer-readable medium described above may further include processes, features, means, or instructions for dropping the second uplink data transmission based at least in part on the priority.

Some examples of the method, apparatus, and non-transitory computer-readable medium described above may further include processes, features, means, or instructions for determining a priority for retransmissions based at least in part on the received configuration. Some examples of the method, apparatus, and non-transitory computer-readable medium described above may further include processes, features, means, or instructions for identifying a collision between concurrent uplink transmissions, the concurrent uplink transmissions comprising a retransmission of the uplink data and a second uplink data transmission during a third TTI. Some examples of the method, apparatus, and non-transitory computer-readable medium described above may further include processes, features, means, or instructions for dropping the second uplink data transmission based at least in part on the priority.

In some examples of the method, apparatus, and non-transitory computer-readable medium described above, the determining the priority comprises: determining a highest priority for transmissions during TTIs having the second duration. In some examples of the method, apparatus, and non-transitory computer-readable medium described above, the determining the priority comprises: determining a highest priority for retransmissions during TTIs having the second duration.

In some examples of the method, apparatus, and non-transitory computer-readable medium described above, the determining the priority comprises: identifying a channel priority for one or more logical channels transmitted on the respective TTIs. Some examples of the method, apparatus, and non-transitory computer-readable medium described above may further include processes, features, means, or instructions for identifying a channel latency condition for the one or more logical channels transmitted on the respective TTIs. Some examples of the method, apparatus, and non-transitory computer-readable medium described above may further include processes, features, means, or instructions for determining the priority based at least in part on the identified channel priority, or the identified channel latency condition, or any combination thereof. In some examples of the method, apparatus, and non-transitory computer-readable medium described above, the configuration comprises a periodicity for the respective TTIs, the respective TTIs being designated for semi-persistent scheduling (SPS) transmissions.

Some examples of the method, apparatus, and non-transitory computer-readable medium described above may further include processes, features, means, or instructions for receiving an indication to activate the SPS transmissions or to deactivate the SPS transmissions. Some examples of the method, apparatus, and non-transitory computer-readable medium described above may further include processes, features, means, or instructions for transmitting a confirmation of activation of the SPS transmissions or deactivation of the SPS transmissions, wherein the confirmation may be transmitted during a temporally first TTI of the TTIs.

In some examples of the method, apparatus, and non-transitory computer-readable medium described above, the periodicity comprises a duration that may be less than the first duration. Some examples of the method, apparatus, and non-transitory computer-readable medium described above may further include processes, features, means, or instructions for receiving a second configuration for the location of the second TTI, wherein the location of the second TTI may be dynamically configured.

Some examples of the method, apparatus, and non-transitory computer-readable medium described above may further include processes, features, means, or instructions for identifying a location of the first TTI in accordance with the configuration. Some examples of the method, apparatus, and non-transitory computer-readable medium described above may further include processes, features, means, or instructions for transmitting the uplink data during the first TTI or during the second TTI based at least in part on the received configuration.

Some examples of the method, apparatus, and non-transitory computer-readable medium described above may further include processes, features, means, or instructions for identifying a preconfigured logical channel mapping for the uplink transmissions. Some examples of the method, apparatus, and non-transitory computer-readable medium described above may further include processes, features, means, or instructions for determining whether to transmit the uplink data during the first TTI or during the second TTI based at least in part on the preconfigured logical channel mapping, wherein transmitting the uplink data may be based on the determination.

In some examples of the method, apparatus, and non-transitory computer-readable medium described above, determining that the first TTI may be available prior to the second TTI based at least in part on the identified location of the first TTI and the identified location of the second TTI, wherein transmitting the uplink data comprises: transmitting the uplink data during the first TTI based on the determination. In some examples of the method, apparatus, and non-transitory computer-readable medium described above, determining that the second TTI may be available prior to the first TTI based at least in part on the identified location of the first TTI and the identified location of the second TTI, wherein transmitting the uplink data comprises: transmitting the uplink data during the second TTI based on the determination.

Some examples of the method, apparatus, and non-transitory computer-readable medium described above may further include processes, features, means, or instructions for identifying a payload size of the uplink data or a size of the resource grant. Some examples of the method, apparatus, and non-transitory computer-readable medium described above may further include processes, features, means, or instructions for determining whether to transmit the uplink data during the first TTI or during the second TTI based at least in part on the payload size, or the size of the resource grant, or a combination thereof, wherein transmitting the uplink data may be based on the determination.

Some examples of the method, apparatus, and non-transitory computer-readable medium described above may further include processes, features, means, or instructions for identifying a latency condition associated with the uplink data. Some examples of the method, apparatus, and non-transitory computer-readable medium described above may further include processes, features, means, or instructions for determining whether to transmit the uplink data during the first TTI or during the second TTI based at least in part on the latency condition, wherein transmitting the uplink data may be based on the determination.

Some examples of the method, apparatus, and non-transitory computer-readable medium described above may further include processes, features, means, or instructions for receiving HARQ feedback for the transmitted uplink data. Some examples of the method, apparatus, and non-transitory computer-readable medium described above may further include processes, features, means, or instructions for retransmitting the uplink data during a third TTI that immediately follows the transmission of the uplink data in accordance with the configuration, the retransmitting responsive to the received HARQ feedback.

In some examples of the method, apparatus, and non-transitory computer-readable medium described above, the transmission of the uplink data may be during the first TTI and the third TTI may have the second duration. In some examples of the method, apparatus, and non-transitory computer-readable medium described above, the transmission of the uplink data may be during the second TTI and the third TTI may have the first duration. In some examples of the method, apparatus, and non-transitory computer-readable medium described above, the first duration comprises one millisecond, and wherein the second duration comprises two symbol periods, three symbol periods, or seven symbol periods.

A method of wireless communication is described. The method may include configuring a resource grant for uplink transmissions comprising a set of TTIs designated for the uplink transmissions, wherein the TTIs include one or more first TTIs each having a first duration and one or more second TTIs, each of the one or more second TTIs having a second duration that is shorter than the first duration, transmitting, to a UE, signaling that indicates an uplink transmission configuration based at least in part on the configured resource grant, and receiving uplink data from the UE based at least in part on the uplink transmission configuration.

An apparatus for wireless communication is described. The apparatus may include means for configuring a resource grant for uplink transmissions comprising a set of TTIs designated for the uplink transmissions, wherein the TTIs include one or more first TTIs each having a first duration and one or more second TTIs, each of the one or more second TTIs having a second duration that is shorter than the first duration, means for transmitting, to a UE, signaling that indicates an uplink transmission configuration based at least in part on the configured resource grant, and means for receiving uplink data from the UE based at least in part on the uplink transmission configuration.

Another apparatus for wireless communication is described. The apparatus may include a processor, memory in electronic communication with the processor, and instructions stored in the memory. The instructions may be operable to cause the processor to configure a resource grant for uplink transmissions comprising a set of TTIs designated for the uplink transmissions, wherein the TTIs include one or more first TTIs each having a first duration and one or more second TTIs, each of the one of more second TTIs having a second duration that is shorter than the first duration, transmit, to a UE, signaling that indicates an uplink transmission configuration based at least in part on the configured resource grant, and receive uplink data from the UE based at least in part on the uplink transmission configuration.

A non-transitory computer readable medium for wireless communication is described. The non-transitory computer-readable medium may include instructions operable to cause a processor to configure a resource grant for uplink transmissions comprising a set of TTIs designated for the uplink transmissions, wherein the TTIs include one or more first TTIs each having a first duration and one or more second TTIs, each of the one of more second TTIs having a second duration that is shorter than the first duration, transmit, to a UE, signaling that indicates an uplink transmission configuration based at least in part on the configured resource grant, and receive uplink data from the UE based at least in part on the uplink transmission configuration.

In some examples of the method, apparatus, and non-transitory computer-readable medium described above, the uplink transmission configuration comprises a periodicity for respective TTIs of the set of TTIs, the respective TTIs being designated for SPS transmissions. Some examples of the method, apparatus, and non-transitory computer-readable medium described above may further include processes, features, means, or instructions for transmitting an indication to activate the SPS transmissions or to deactivate the SPS transmissions. Some examples of the method, apparatus, and non-transitory computer-readable medium described above may further include processes, features, means, or instructions for receiving, from the UE, a confirmation of activation of the SPS transmissions or deactivation of the SPS transmissions, wherein the confirmation may be received on a temporally first TTI in accordance with the periodicity.

In some examples of the method, apparatus, and non-transitory computer-readable medium described above, the periodicity comprises a duration that may be less than the first duration. Some examples of the method, apparatus, and non-transitory computer-readable medium described above may further include processes, features, means, or instructions for transmitting HARQ feedback responsive to the received uplink data. Some examples of the method, apparatus, and non-transitory computer-readable medium described above may further include processes, features, means, or instructions for receiving a retransmission of the uplink data during a third TTI, the third TTI immediately following the transmitted HARQ feedback in accordance with the uplink transmission configuration.

In some examples of the method, apparatus, and non-transitory computer-readable medium described above, the retransmission of the uplink data comprises a same RV as the received uplink data. In some examples of the method, apparatus, and non-transitory computer-readable medium described above, the retransmission of the uplink data comprises a predetermined incremental version. In some examples of the method, apparatus, and non-transitory computer-readable medium described above, the first duration comprises one millisecond, and wherein the second duration comprises two symbol periods, three symbol periods, or seven symbol periods.

DETAILED DESCRIPTION

Figure 1:
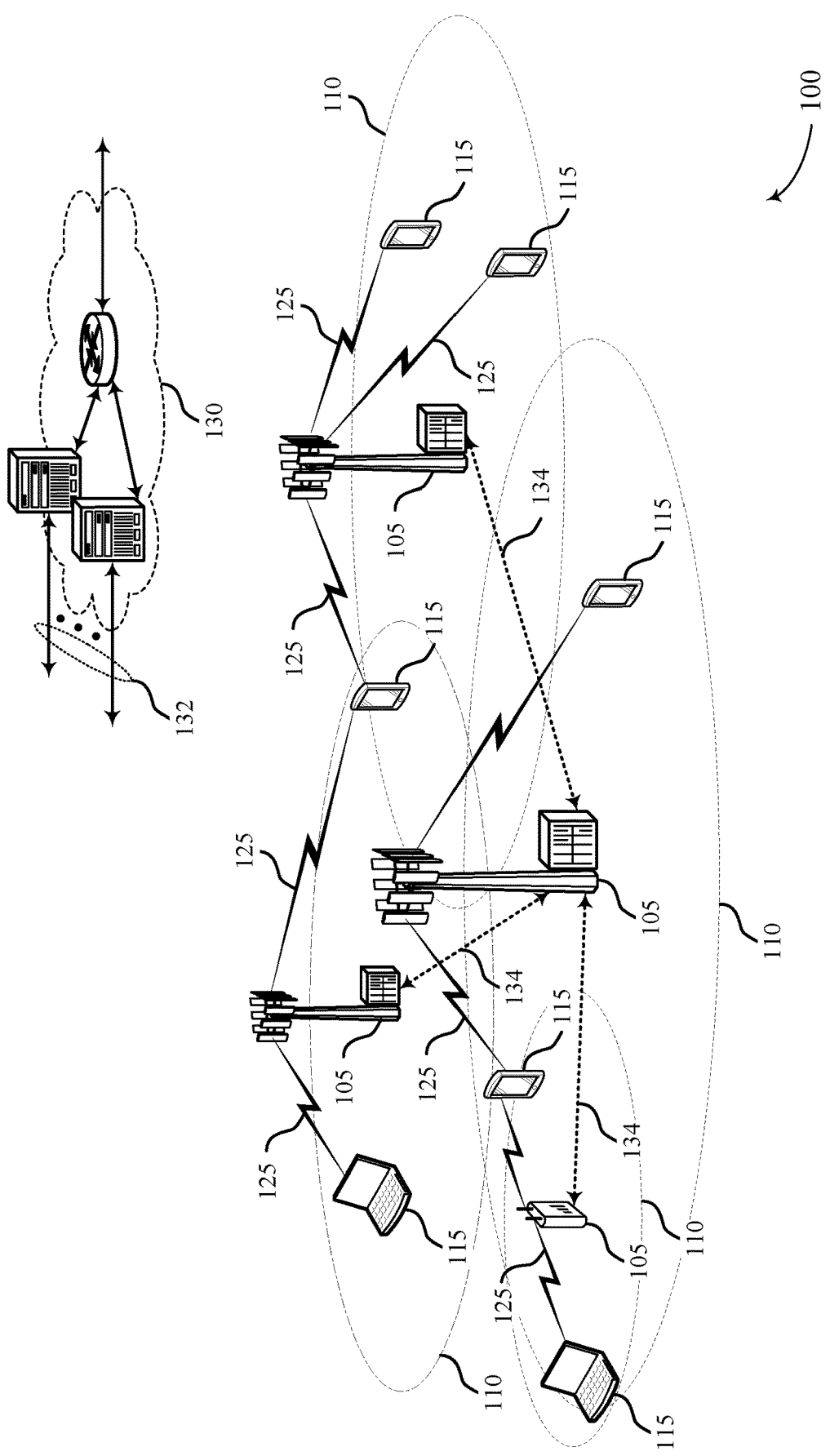
FIG. 1 illustrates an example of a system for wireless communication that supports periodic grants for multiple transmission time interval (TTI) configurations in accordance with aspects of the present disclosure.

A wireless communications system may utilize a resource grant that is configured by the base station, where the resource grant may not be received dynamically over a physical channel. For instance, a base station and user equipment (UE) may support semi-persistent scheduling (SPS) for uplink and downlink communications. With SPS, a base station may schedule a UE to transmit uplink messages on resources reserved and available at a set periodicity. In other examples, the configured resource grant may include a grant for non-periodic transmissions, where the UE may transmit on resources that may not have a set periodicity. Additionally, wireless communications systems may support multiple communications services, such as Long Term Evolution (LTE) services, low latency services, and the like. These different services may correspond to different transmission time intervals (TTIs). For example, a TTI corresponding to an LTE service may utilize a 1 millisecond (ms) TTI, whereas low latency services may have a shortened TTI (sTTI) that has a duration of less than 1 ms (e.g., a slot, two symbols, three symbols, etc.). In some cases, an sTTI may have a different numerology (e.g., waveform numerology) than a 1 ms TTI, such as a different subcarrier spacing. Accordingly, configured resource grants, such as SPS communications, may utilize these TTIs having various durations and numerologies, and it may thus be beneficial to utilize uplink transmission configurations that enable coherent uplink transmissions by a UE for different TTIs. Such techniques may likewise support efficient low latency communications while coexisting with legacy or non-low latency communications.

As described herein, a set of TTI locations for uplink transmission may be configured for resources grants, such as cases where TTIs may be configured with a periodicity of less than 1 ms. For example, an SPS configuration may define locations for a set of periodic TTIs within a 1 ms TTI (e.g., between two and six sTTI locations within the 1 ms TTI). Additionally, the SPS configuration may enable retransmissions of uplink data at an TTI location that immediately follows (e.g., as defined by the periodicity of the SPS configuration) receipt of hybrid automatic repeat request (HARQ) feedback from a base station. In some examples, SPS may be configured to support multiple TTIs having different durations, where the configuration may support the use of either a first TTI (e.g., a 1 ms TTI) or a second TTI (e.g., a two-symbol TTI) for uplink transmissions. Additionally or alternatively, the configuration may support the prioritization of SPS transmissions for one TTI over another, such as in the case of collisions of a TTI having a first duration and another TTI having a second, different, duration.

Aspects of the disclosure are initially described in the context of a wireless communications system. Examples are also provided that describe SPS configurations that utilize a periodicity enabling efficient low latency communications. Aspects of the disclosure are further illustrated by and described with reference to apparatus diagrams, system diagrams, and flowcharts that relate to periodic grants for multiple TTI configurations.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support efficient coexistence of SPS configurations using TTIs having different durations and numerologies.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, S2). Base stations 105 may communicate with one another over backhaul links 134 (e.g., X1, X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as a base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and a network device, or core network 130 supporting radio bearers for user plane data. For example, RRC may be used for signaling of SPS configurations from a base station 105 to a UE 115. At the physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI.

In other cases, a TTI may be shorter than a subframe or may be dynamically selected (e.g., in short TTI bursts or in selected component carriers using short TTIs). For instance, a TTI having a reduced duration may be referred to as an sTTI. Using sTTIs may support low latency services (e.g., ultra-low latency (ULL), voice over LTE (VoLTE), etc.) for wireless communications. An sTTI may be a subset of a TTI that corresponds to non-low latency services. For example, an sTTI may be defined as a duration of two orthogonal frequency division multiplexing (OFDM) symbol periods, three OFDM symbol periods, or seven OFDM symbol periods (i.e., a slot), which may be subsets of a 1 ms TTI (e.g., a subframe). In some examples, using sTTIs may allow for shortened HARQ turnaround time, enabling HARQ to be terminated faster than systems using TTIs having a longer duration. In such cases, communications using sTTIs may result in lower jitter, lower de-jitter buffer depth, and reduced end to end delay. In some cases, different TTIs may have different numerologies. For example, an sTTI may have a different numerology (such as a subcarrier spacing) than a 1 ms TTI. A subcarrier spacing of a TTI may be based on various propagation characteristics, such as delay spread and Doppler spread, and may also change with cell size. Accordingly, different TTIs may utilize different waveform numerologies to account for such characteristics.

A resource element may consist of one symbol period and one subcarrier (e.g., a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

In some cases LTE networks may be designed for transfer of data packets, and may use a circuit switched fall back for voice communications. However, an LTE network may also be used for voice communications using a packet based system similar to voice over IP (VoIP) applications, such as Skype. This may be accomplished using VoLTE technology. There may be several key differences between VoLTE and VoIP. For example, VoLTE service may include an explicit quality of service (QoS) target or threshold. To achieve the QoS threshold in poor radio conditions, VoLTE packets may utilize an IP multimedia subsystem (IMS) and other network features to ensure low latency and improved error correction.

Wireless communications system 100 may support SPS communications between a UE 115 and a base station 105, which may reduce signaling overhead (e.g., overhead that may be associated with dynamic scheduling) and allow for ready uplink (or, in some cases, downlink) transmissions without the necessity of repeated resource grants. SPS may involve scheduling specific resources to UE 115 (e.g., resources on the physical uplink shared channel (PUSCH)) for a current transmission and for multiple future transmissions. Base station 105 may configure a UE 115 for SPS by indicating the resources allocated to the UE 115 and a periodicity of the resource allocations. For example, base station 105 may designate frequency resources on specific TTIs (e.g., SPS TTIs) for SPS uplink transmissions from a UE 115. The SPS configuration may be indicated by base station 105 using radio resource control (RRC) signaling (e.g., in an SPS-config message). To activate SPS for a particular UE 115, the base station 105 may send a scheduling command or scheduling grant to UE 115.

In some cases, the periodicity of the resource allocations may be defined by the duration between TTIs designated for SPS uplink transmissions. For example, the base station 105 my schedule the UE 115 to transmit an uplink message every ten TTIs (or every ten sTTIs). By using SPS allocations, base station 105 may avoid the overhead associated with repeated uplink grant transmissions for data communications occurring at a predictable rate. In some examples, the resource block (RB) assignments, the modulation and coding scheme (MCS), and the like, may be similar for all uplink transmissions using the allocated SPS resources. Further, wireless communications system 100 may support techniques for releasing an SPS configuration when a UE 115 repeatedly fails to use the allocated resources (e.g., when UE 115 has no data to transmit for a period of time).

In some cases, the periodicity of SPS resource allocations may be equal to or greater than 10 ms (e.g., 10 ms, 20 ms, 40 ms, 80 ms). However, as described herein, the periodicity may be configured to be less than 10 ms, such as less than 1 ms. A UE 115 may use these resources to communicate with base station 105 by transmitting data or control packets using the uplink SPS resources. For example, the UE 115 may transmit uplink packets to base station 105 at a predictable rate when using a VoIP service. In some examples, a UE 115 may be scheduled for an SPS uplink transmission, but the UE 115 may not have data to transmit. As such, UE 115 may transmit zero-padded packets to base station 105. The transmission of zero-padded packets may allow the base station 105 to determine when to cancel an SPS configuration for the UE 115. For example, after receiving a threshold number of zero-padded packets consecutively, the base station 105 may cancel an SPS configuration for the UE 115 by releasing the SPS resources. Additionally, because the base station 105 may expect an uplink message on each SPS TTI, the transmission of zero-padded packets may allow the base station 105 to determine when a packet was not received due to interference or the like. Alternatively, the UE 115 may use uplink skipping, where one or more SPS TTIs may be "skipped" (e.g., no bits transmitted during the respective TTIs) in cases when the UE 115 may not have data to transmit. Such techniques may prevent transmissions of the zero-padded packets by the UE 115, thereby enabling power savings at the UE 115 and avoiding other inefficiencies that may be associated with transmissions of padding data.

Wireless communications system 100 may support uplink transmissions based on a configured resource grant (e.g., SPS configurations) that enable uplink transmissions during sTTIs. For example, a base station 105 may configure SPS for a set of TTIs, where the configuration may include a periodicity between sTTIs (e.g., two-symbol, three-symbol, seven-symbol TTIs, etc.) that may be used by a UE 115 for uplink transmissions. The base station 105 may signal the SPS configuration to the UE 115, and the UE 115 may then identify locations of TTIs for use in SPS transmissions. For instance, the UE 115 may identify the location of a set of sTTIs that are designated for SPS and that occur at a certain periodicity set by the configuration. Upon identifying the TTI locations, the UE 115 may transmit uplink data during one or more of the identified TTIs in accordance with the configuration. In some examples, the UE 115 may send retransmissions of uplink data to the base station 105 using the SPS configuration by utilizing a next available TTI based on the configuration.

Figure 2:
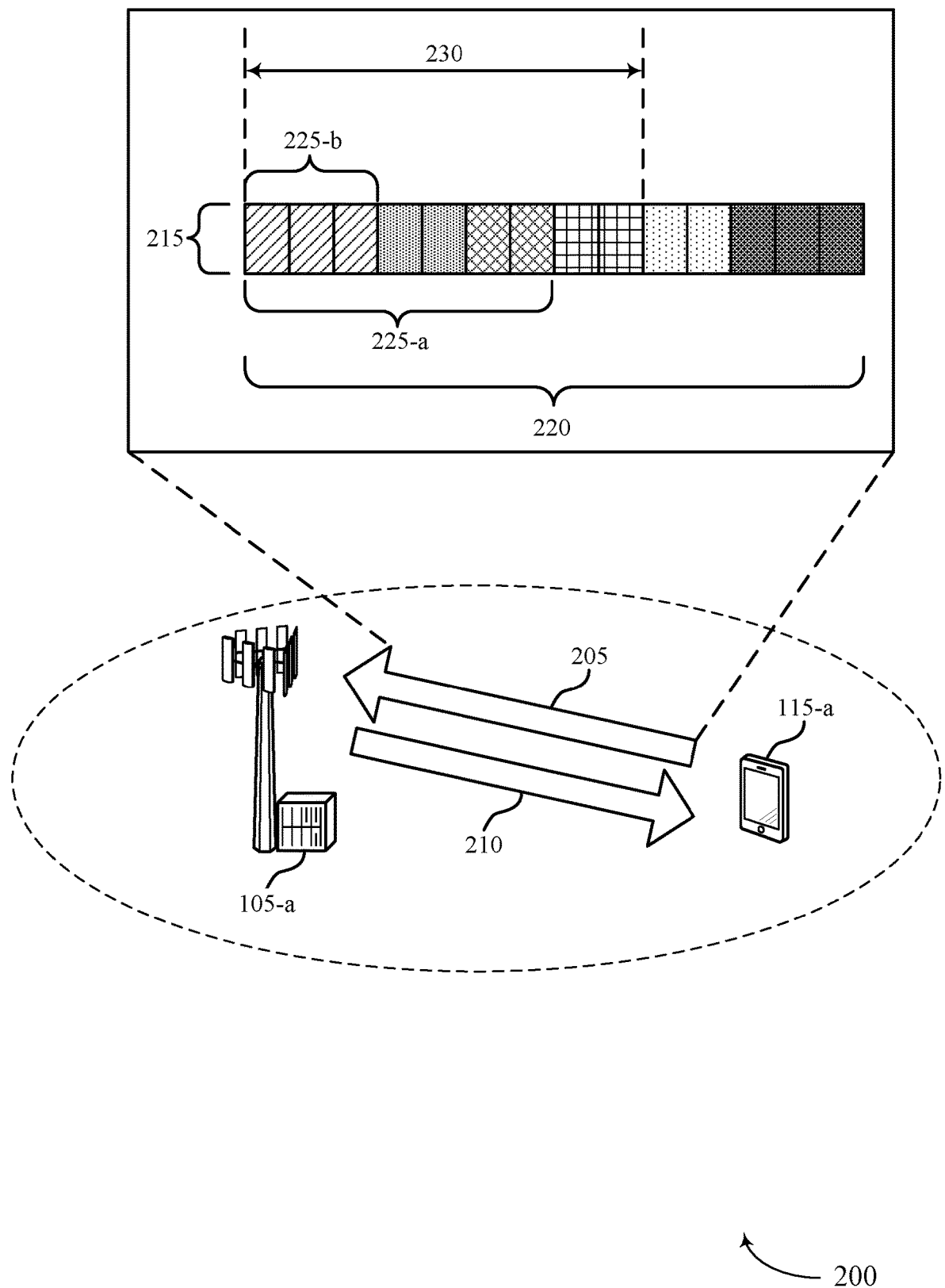
FIG. 2 illustrates an example of a wireless communications system that supports periodic grants for multiple TTI configurations in accordance with aspects of the present disclosure.

FIG. 2 illustrates an example of a wireless communications system 200 that supports periodic grants for multiple TTI configurations in accordance with various aspects of the present disclosure. In some examples, wireless communications system 200 may implement aspects of wireless communications system 100. For example, wireless communications system includes a base station 105-a and a UE 115-a, which may be examples of the corresponding devices described with reference to FIG. 1. Wireless communications system 200 may support the use of SPS configured by base station 105-*a* for periodic uplink transmissions on sTTIs. While aspects of the disclosure described herein are related to SPS communications, the same techniques may apply to non-periodic communications, such as communications that utilize a configured resource grant (e.g., a resource grant that is dynamically transmitted/received over a physical channel).

UE 115-*a* may send uplink transmissions to base station 105-*a* over uplink communication link 205. Similarly, base station 105-*a* may send downlink transmissions to UE 115-*a* over downlink communication link 210. In some cases, wireless communications system 200 may support different TTI configurations 215 for communications data sent over uplink communication link 205 and downlink communication link 210. For example, TTI configuration 215 may be an example of an allocation of time-frequency resources for communication between UE 115-*a* and base station 105-*a* over uplink communication link 205. TTI configuration 215 may include various configurations for TTIs utilized for transmitting data, which may include a TTI 220 (e.g., a legacy TTI, a subframe, a 1 ms TTI, etc.). TTI configuration 215 may also include a configuration of multiple sTTIs 225, including, for example, two sTTIs 225-*a* having a duration of seven symbol periods (e.g., a slot-sTTI), or multiple sTTIs 225-*b* having a duration of two or three symbol periods. It is noted that an sTTIs described herein may be of any duration less than 1 ms, including the examples of slot, sub-slot, seven-symbol, two-symbol, and three-symbol sTTIs. In some examples, communications between UE 115-*a* and base station 105-*b* may utilize one or a combination of TTIs having different durations, where UE 115-*a* may be configured to use a TTIs 220, or sTTIs 225-*a*, or sTTIs 225-*b*, or any combination thereof. In some cases, different TTI configurations 215 may be associated with different control format indicators (CFIs).

In some cases, wireless communications system 200 may support configured uplink grants (e.g., resource grants), such as for SPS communications, where base station 105-*a* may configure UE 115-*a* for SPS uplink communications to reduce overhead. By scheduling the UE 115 with periodic TTIs for SPS transmission (or non-periodic TTIs for other communications using a configured grant that may or may not be transmitted over a physical channel), base station 105-*a* may reduce the overhead associated with dynamic scheduling (e.g., scheduling using a PDCCH) and reduce latency of communications. In some cases, downlink transmissions sent by base station 105-*a* to UE 115-*a* may include configuration information (e.g., sent via RRC signaling), where the configuration is associated with sTTIs 225. For example, base station 105-*a* may send an SPS configuration to UE 115-*a*, where the SPS configuration information includes a periodicity 230 between respective sTTIs 225 (or an interval between sTTIs 225) designated for uplink communications. Accordingly, the SPS configuration may include an indication of sTTI 225 locations for SPS that UE 115-*a* may use. For example, the SPS configuration may indicate an index of sTTIs 225 associated with a resource grant SPS transmissions.

Base station 105-*a* may configure a set of sTTI locations for SPS transmissions within TTI 220. For example, TTI 220 may include sTTIs 225-*b* with a duration of two or three symbols, where there may be six sTTI 225-*b* locations within the TTI 220 available for SPS transmissions. In another example, there may be two sTTIs 225-*a* locations for SPS transmissions within TTI 220. As a result, UE 115-*a* may be configured to use one, multiple, or a subset of the sTTI locations for SPS transmissions that are defined in accordance with a periodicity 230 of SPS TTIs. Certain sTTI locations may be identified for uplink communications, where periodicity 230 defines a duration between respective sTTIs 225. As an example, an SPS configuration may have a periodicity 230 of 5 ms, and may indicate that UE 115-*a* may use one or more sTTI 225 locations in accordance with periodicity 230 for uplink transmissions. In such cases, UE 115-*a* may transmit every 5 ms using one sTTI 225, or multiple sTTIs, that have locations that correspond to periodicity 230. In another example, the SPS configuration may indicate that UE 115-*a* may use a subset of sTTI 225 locations. In other cases, the sTTI locations for SPS transmission may vary between SPS transmissions. That is, the sTTI transmission locations may be dynamically determined by UE 115-*a*. In some examples, the location of sTTIs may be independently configured. Additionally, the sTTI locations may be dynamically configured such that the location of an sTTI 225 may, for example, change from subframe to subframe.

Base station 105-*a* may configure SPS with periodicity 230 that supports the use of sTTIs 225 for low latency communications. As an example, to support low latency applications with an inter-packet interval of less than 1 ms, SPS used for sTTIs 225 may use periodicity 230 (e.g., a duration between different sTTIs designated for uplink communications) with a duration of less than 1 ms. For instance, periodicity 230 may be equivalent to 0.5 ms (such as in cases when sTTIs 225-*a* having a duration of seven symbol periods are used). In other cases, periodicity 230 may be defined in terms of subframe lengths. For example, periodicity 230 may be defined in increments of half subframes (e.g., increments of seven symbols) when using sTTIs 225 with a duration of seven symbols. In another example, periodicity 230 may be configured to be any value when using sTTIs 225-*b* with a duration of two or three symbols. Additionally or alternatively, periodicity 230 may be defined as a number of sTTI lengths (e.g., ten sTTI lengths). In some cases, a temporally first location of an sTTI used for uplink transmissions by UE 115-*a* may be located in a first sTTI 225-*b* after periodicity 230. In some examples, the configuration of SPS may be signaled using RRC messaging from base station 105-*a* to UE 115-*a*. Additionally, the activation or deactivation of SPS may be transmitted using downlink control information (DCI) (e.g., using a certain DCI format).

In some examples, SPS may be configured for both TTIs 220 and sTTIs 225. UE 115-*a* may determine whether to transmit data using, for example, a 1 ms TTI 220 or an sTTI 225 location based on the periodicity of the SPS configuration. In some cases, UE 115-*a* may select either TTI 220 or an sTTI 225 based on a logical channel mapping. In such cases, when both 1 ms TTIs and SPS for sTTIs 225 are used, UE 115-*a* may first identify available data to be transmitted. UE 115-*a* may then wait to transmit the identified data until a particular TTI (e.g., either a 1 ms TTI 220 or an sTTI 225) determined to be best suited for transmitting the identified data. For example, UE 115-*a* may determine to transmit data at a next available TTI location (e.g., a temporally first TTI location).

UE 115-*a* may determine a transmission location (e.g., either a 1 ms TTI 220 or an sTTI 225) based on the amount of data to be transmitted (i.e., a payload size) or latency targets. For instance, UE 115-*a* may determine that available data may be transmitted during a two-symbol sTTI 225-*b*. UE 115-*a* may then wait until the next sTTI location to transmit the data. In another example, UE 115-*a* may determine that it would be more efficient (or take less time) to use a 1 ms TTI 220 for transmitting data (e.g., as compared to using multiple sTTIs 225-b to transmit the same data). In other cases, a predetermined data size (i.e., payload size) threshold may be used to determine which TTI location to use for transmitting data. For instance, if the size of data to be transmitted satisfies a predetermined threshold, a 1 ms TTI 220 may be used (e.g., a temporally first TTI 220 in accordance with the periodicity 230). Alternatively, if the amount of data is below the predetermined threshold, an sTTI 225 may be used (e.g., a next sTTI 225-a or a next sTTI 225-b). In some cases, UE 115-a may also identify a size of a resource grant (e.g., a configured grant), and may determine whether to transmit during a 1 ms TTI 220 or an sTTI 225 based on the size of the resource grant. In any event, UE 115-a may choose the location of a TTI that results in the most efficient transmission of uplink data based on the configuration. In some cases, a retransmission of uplink data for SPS configurations for both 1 ms TTIs 220 and sTTIs 225 may be sent at a next SPS location, and the TTI used for retransmission may be different than the TTI used for the initial transmission of the uplink data. For instance, a transmission of uplink data on an sTTI 225 may fail after several attempts, and a 1 ms TTI 220 may be used for the retransmission at a subsequent location in accordance with the periodicity 230.

SPS locations may be used for performing asynchronous HARQ retransmissions. In some cases, if one or more of the uplink messages are not received or successfully decoded by base station 105-a, UE 115-a may attempt to retransmit the uplink message. However, in cases where uplink skipping is used, UE 115-a may not receive a grant for retransmission if a first transmission was not detected by base station 105-a. In such cases, UE 115-a may retransmit the uplink data to base station 105-a using a next SPS transmission location (e.g., a sTTI location based on periodicity 230 that immediately follows receipt of HARQ feedback that triggers the retransmission). In some cases, retransmissions may use a same redundancy version (RV) used for a first transmission or a predetermined incremental redundancy. In other cases, a retransmission by UE 115-a to base station 105-a may occur after the expiration of a timer (e.g., a HARQ round trip time (RTT) timer). The use of the timer may allow base station 105-a to provide a grant for retransmission, and the timer value may be greater than a processing timer.

In some cases, an SPS configuration may include prioritization or rules that may be used by UE 115 to prioritize transmissions on a 1 ms TTI 220 or sTTI 225 in cases of a collision. For example, UE 115-a may be configured to prioritize using sTTI 225 locations over using a 1 ms TTI 220 (e.g., based on latency considerations). In other cases, UE 115-a may be configured to give higher priority to retransmissions. As an example, if a first data transmission sent by UE 115-a using downlink communication link 210 was not received by base station 105-a, UE 115-a may prioritize sending a retransmission of the first data transmission at a next SPS transmission location instead of sending a second data transmission. Additionally or alternatively, a wireless communications system 200 may determine to prioritize transmissions on certain TTIs (e.g., either 1 ms TTIs or sTTIs 225) based on a logical channel priority. In some examples, a priority for different TTIs may be pre-configured or may be configured by base station 105-a and provided to UE 115-a. For instance there may always be a higher priority for sTTIs, Additionally or alternatively, there may always be a higher priority for retransmissions in addition to a higher priority for sTTIs (e.g., if sTTIs 225 are utilized for retransmissions). In some cases, the priority may be based on priority and latency requirements of the logical channels transmitted on each TTI (or sTTI).

A confirmation of the activation and deactivation of SPS may be transmitted at a subsequent sTTI 225 in accordance with the periodicity 230 of the SPS configuration (e.g., an sTTI 225 location that immediately follows receipt of the activation). In some cases, UE 115-a may send a confirmation of SPS activation or deactivation (e.g., using a MAC CE) at a SPS transmission location that follows (i.e., is closest in time too) the activation or deactivation signal sent by base station 105-a (e.g., using DCI). In such examples, the use of an sTTI that corresponds to a temporally first TTI location may be used for fast activation of SPS.

Figure 3:
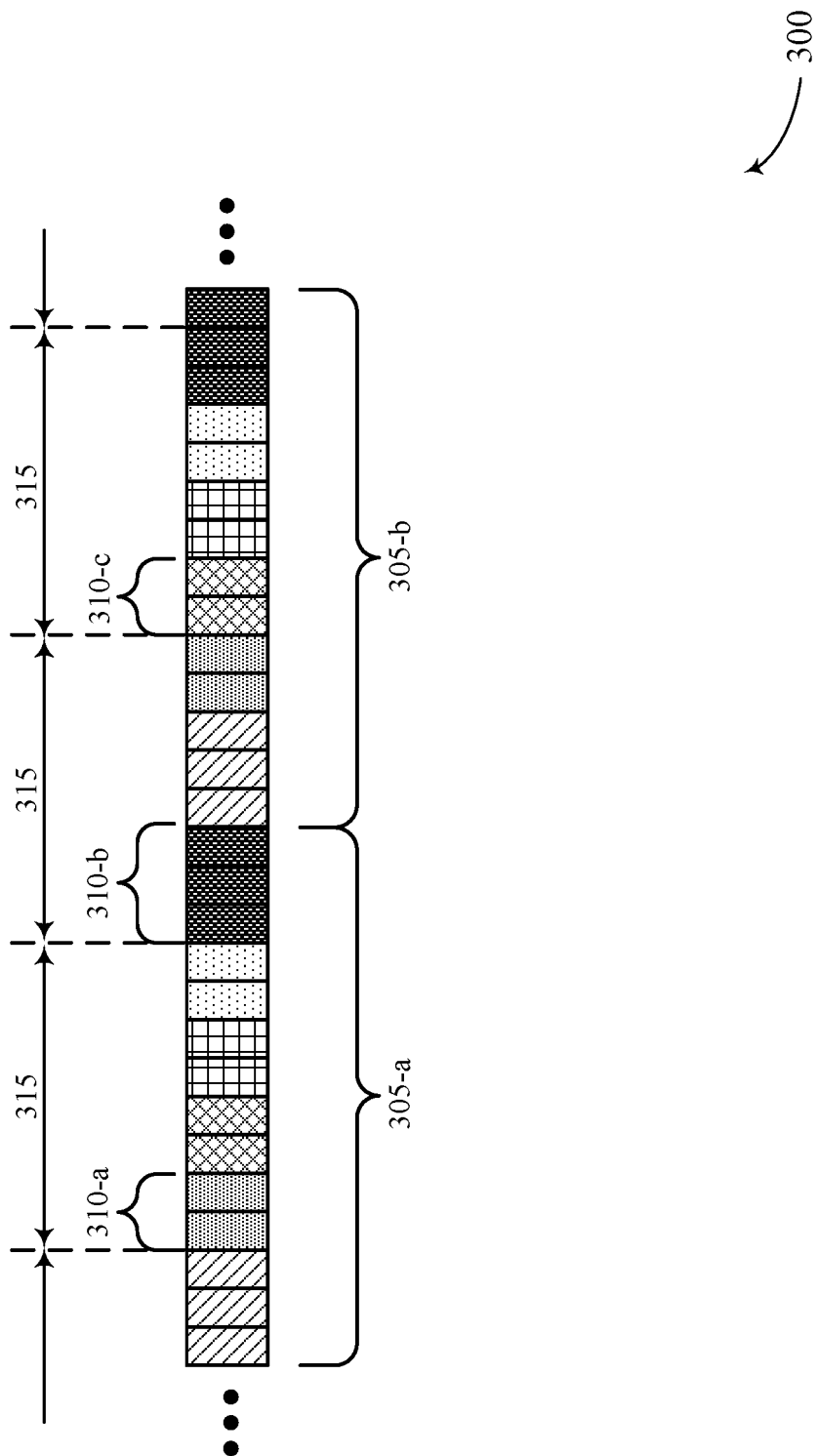
FIGS. 3 and 4 illustrate examples of semi-persistent scheduling (SPS) configurations in a system that supports periodic grants for multiple TTI configurations in accordance with aspects of the present disclosure.

FIG. 3 illustrates an example of an SPS configuration 300 in a system that supports periodic grants for multiple TTI configurations in accordance with various aspects of the present disclosure. SPS configuration 300 may illustrate an example of sTTI locations configured for SPS transmissions by a UE 115. For example, SPS configuration 300 may include a first 1 ms TTI 305-a and a second 1 ms TTI 305-b, where each 1 ms TTI 305 may include a number of symbol periods (e.g., 14 OFDM symbols). The 1 ms TTIs 305 may further include multiple sTTIs 310 that are designated for SPS transmissions by a UE 115. Accordingly, SPS configuration 300 may illustrate an sTTI SPS configuration for locations of two-symbol sTTIs 310 or three-symbol sTTIs 310. SPS configuration 300 illustrates two 1 ms TTIs 305 for brevity, and it is understood that the description below may apply to any number of 1 ms TTIs 305, as well as any number of sTTIs 310 or other TTIs having different durations and numerology.

In some cases, the locations of sTTIs 310 for use with an SPS configuration may coincide with periodicity 315. For example, the SPS configuration may define a periodicity 315, and various sTTIs 310 may be utilized for uplink transmissions in accordance with periodicity 315. As an illustrative example, periodicity 315 may correspond to a duration that is less than a 1 ms TTI 305. Accordingly, a UE 115 configured for uplink transmissions using SPS configuration, where the UE 115 may transmit uplink data using any one of sTTI 310-a, sTTI 310-b, sTTI 310-c in accordance with periodicity 315. The UE 115 may use each sTTI 310, or only a subset of sTTIs 310 for transmitting uplink data based on SPS configuration 300. For example, the UE 115 may use sTTI 310-a, sTTI 310-b, and sTTI 310-c for uplink data transmissions, or may only use sTTI 310-a and sTTI 310-c (e.g., such as in the case where the UE 115 supports uplink skipping). In other examples, the UE 115 may identify multiple sTTI locations within a period for uplink transmission. For example, the UE 115 may utilize sTTI 310-a and a subsequent two-symbol sTTI within the same periodicity 315 for an uplink transmission. Different combinations of sTTIs within a periodicity 415 may be used.

In some examples, the UE 115 may receive DCI that activates or deactivates SPS (e.g., received during a preceding TTI). For example, the UE 115 may receive an indication of a starting TTI for scheduled SPS resources (e.g., identified by an SFN, subframe number, TTI number, sTTI number, etc.). In such cases, the UE 115 may use an sTTI location that is first in time respective to the received activation or deactivation. For example, should the UE 115 receive an activation of SPS prior to sTTI 310-a (e.g., on a preceding 1 ms TTI 305 (not shown)), the UE 115 may provide a confirmation of the activation during sTTI 310-a based on SPS configuration 300.

A UE 115 may determine whether to transmit using an sTTI 310 in cases where there is a collision of different scheduled uplink transmissions. For instance, a separate uplink transmission may coincide with an SPS transmission during sTTI 310-*a*. In such cases, the UE 115 may identify the collision, and may prioritize the transmission on sTTI 310-*a* based on the duration of sTTI 310-*a* (e.g., if the other uplink transmission was to be sent using a 1 ms TTI 305). In other cases, the UE 115 may prioritize TTIs that include retransmission in cases of collisions between TTIs having different durations (e.g., based on a network configuration).

Figure 4:
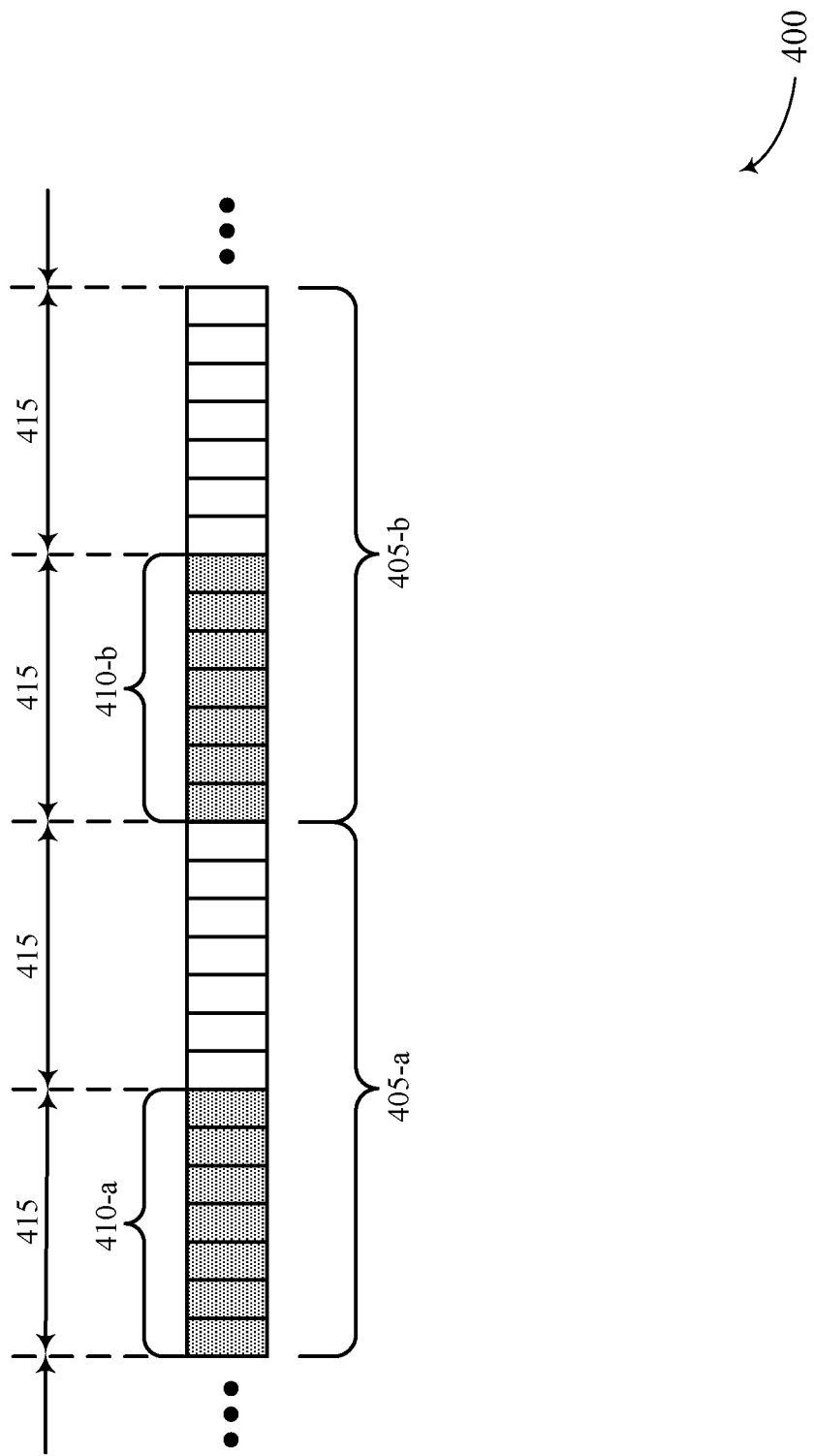

FIG. 4 illustrates an example of an SPS configuration 400 in a system that supports periodic grants for multiple TTI configurations in accordance with various aspects of the present disclosure. SPS configuration 400 may illustrate an example of sTTI locations configured for SPS transmissions by a UE 115. For example, SPS configuration 400 may include a first 1 ms TTI 405-*a* and a second 1 ms TTI 405-*b*, where each 1 ms TTI 405 may include a number of symbol periods (e.g., 14 OFDM symbols). Each 1 ms TTIs 405 may further correspond to two sTTIs 410 designated for SPS transmissions by a UE 115. Accordingly, SPS configuration 400 may illustrate an sTTI SPS configuration for locations of seven-symbol sTTIs 410. Additionally, SPS configuration 400 illustrates two 1 ms TTIs 405 for brevity, and it is understood that the description below may apply to any number of 1 ms TTIs 405, as well as any number of sTTIs 410 or other TTIs having different durations and numerology.

In some cases, the locations of sTTIs 410 for use with SPS configuration 400 may coincide with periodicity 415. For example, SPS configuration 400 may define a periodicity 415, and various sTTIs 410 may be utilized for uplink transmissions in accordance with periodicity 415, where periodicity 415 may, in some cases, be less than 1 ms (e.g., multiple periods may occur within a 1 ms TTI 405). As an illustrative example, periodicity 415 may correspond to a duration that is half of a 1 ms TTI 405. However, periodicity 415 may correspond to other durations not explicitly described herein. In any event, a UE 115 may be configured for uplink transmissions using SPS configuration 400, where the UE 115 may transmit uplink data using any of sTTI 410-*a* and sTTI 410-*b* in accordance with periodicity 415. The UE 115 may use each sTTI 410, or only a subset of sTTIs 410 for transmitting uplink data based on SPS configuration 400. For example, the UE 115 may use both sTTI 410-*a* and sTTI 410-*b*, or may use only sTTI 410-*b* (such as in cases where uplink skipping is utilized by the UE 115).

In some examples, SPS configuration 400 may be associated with the use of different TTIs for uplink transmissions. For example, SPS configuration 400 may include a configuration for a UE 115 to use any combination of sTTIs 410 and 1 ms TTIs 405. In such cases, and as described above, the UE 115 may determine which TTI, between the 1 ms TTI 405 and sTTI 410, to use for transmitting data in accordance with periodicity 415. For instance, the UE 115 may determine that an sTTI 410 is available before a 1 ms TTI 405, and use the sTTI 410 based on the earlier availability. In other cases, the UE 115 may select the TTI 405 or the sTTI 410 based on latency or the amount of uplink data to transmit.

Figure 5:
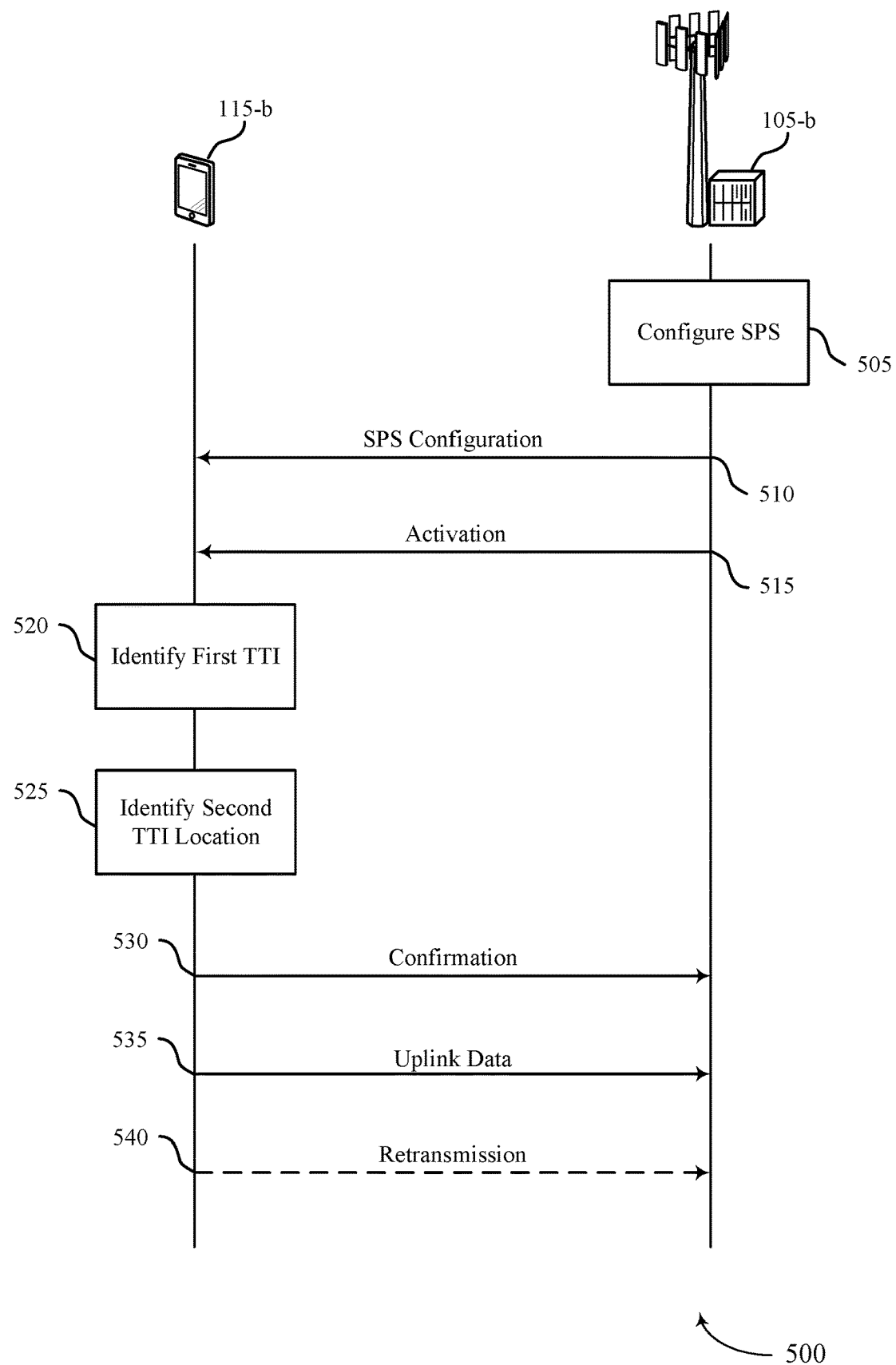
FIG. 5 illustrates an example of a process flow in a system that supports periodic grants for multiple TTI configurations in accordance with aspects of the present disclosure.

FIG. 5 illustrates an example of a process flow 500 in a system that supports periodic grants for multiple TTI configurations in accordance with various aspects of the present disclosure. In some examples, process flow 500 may implement aspects of wireless communications system 100. For example, process flow includes a UE 115-*b* and base station 105-*b*, which may be examples of the corresponding devices described with reference to FIGS. 1 and 2. Process flow 500 may be an example of the use of an SPS configuration for uplink transmissions on sTTIs.

At 505, base station 105-*b* may determine an uplink transmission configuration (e.g., an SPS configuration) for UE 115-*b* to use for uplink data transmissions. For example, base station 105-*b* may determine a periodicity for an SPS configuration and determine sTTI locations that UE 115-*b* may use for SPS transmissions. In other cases, base station 105-*b* may configure a resource grant for a set of TTIs used for non-periodic transmissions. In some cases, base station 105-*b* may determine multiple sTTI locations (e.g., a set of sTTIs in a subframe) to allow UE 115-*b* to use for uplink transmissions. Accordingly, base station 105-*b* may configure SPS transmissions for UE 115-*b*, where the configuration includes a periodicity of TTIs designated for the uplink transmissions. The TTIs may include one or more first TTIs each having a first duration (e.g., 1 ms) and one or more second TTIs, each of the one of more second TTIs (e.g., sTTIs) having a second duration that is shorter than the first duration (e.g., two symbols, three symbols, seven symbols, etc.).

At 510, base station 105-*b* may transmit signaling (e.g., via RRC messaging) that indicates the SPS configuration to UE 115-*b*. The transmitted SPS configuration may convey to UE 115-*b* information regarding an SPS periodicity and sTTI locations in accordance with the periodicity available for uplink transmissions. In some cases, base station 105-*b* may also send a signal to UE 115-*b* activating the use of SPS at 515 (e.g., using DCI).

At 520, UE 115-*b* may identify a first TTI duration associated with uplink transmissions. In some cases, an identified first TTI duration may include a certain number of symbols (e.g., 14 symbols) or a particular time duration. For example, the first TTI duration may correspond to a 1 ms TTI that is associated with SPS transmissions. At 525, UE 115-*b* may identify a second TTI location within a first TTI associated with uplink transmissions. In some cases, a location of a second TTI within a first TTI may be determined by SPS configuration information or predefined. UE 115-*b* may identify a single or multiple TTI locations associated with SPS transmissions for uplink data. In some cases, the SPS configuration may include a configuration both first TTI and the second TTI, and UE 115-*b* may identify a location of the first TTI in accordance with the configuration.

At 530, in response to the activation signaling received at 515, UE 115-*b* may send a confirmation to base station 105-*b* indicating an activation of SPS. In some cases, UE 115-*a* may send a confirmation of SPS activation at a TTI location that immediately follows (i.e., closest in time to) the activation signal sent by base station 105-*a*. For example, a confirmation of an activation of SPS may be sent by UE 115-*b* to base station 105-*b* at the next SPS transmission location. In other cases, UE 115-*b* may send a confirmation of SPS activation at a next available TTI. In some examples, a MAC CE may be used by UE 115-*b* to confirm activation of SPS.

At 535, UE 115-*b* may transmit uplink data to base station 105-*b* based on the identified location of TTIs or sTTIs for SPS. For example, UE 115-*b* may identify available data to be transmitted, and send the available data to base station 105-*b* during one or more sTTIs in accordance with the configuration. In some cases, UE 115-*b* may determine to transmit data at a next available TTI location (e.g., a temporally first TTI location). In other cases, UE 115-*b* may determine a transmission location based on the amount of data to be transmitted (i.e., a payload size) or latency targets. UE 115-*b* may also use a predetermined data size (i.e., payload size) threshold to determine which transmission location to use for transmitting data. In some cases, transmitting the uplink data may include transmitting the uplink data during the first TTI or during the second TTI based on the received SPS configuration.

In some cases, UE 115-*b* may transmit the uplink data based on a priority of different scheduled transmissions. For example, UE 115-*b* may determine a priority associated with transmissions during the second TTI based on the received configuration. UE 115-*b* may then identify a collision between concurrent uplink transmissions, where the concurrent uplink transmissions may include the uplink data transmission during an sTTI and another uplink data transmission during a 1 ms TTI. In such cases, UE 115-*b* may drop the second uplink data transmission based on the priority. In other cases, UE 115-*b* may identify a priority for retransmissions, and may drop one colliding data transmission over another based on the priority.

At 540, UE 115-*b* may optionally send a retransmission of uplink data to base station 105-*b*. For example, if uplink data sent by UE 115-*b* at 535 is not received or not successfully decoded by base station 105-*b*, UE 115-*b* may attempt to retransmit the uplink data. In such cases, UE 115-*b* may retransmit the first data transmission to base station 105-*b* using a next SPS transmission location (e.g., a next set of uplink resources granted through SPS). As an example, a retransmission may use the same RV used for a first transmission or a predetermined incremental redundancy. In some cases, retransmission may occur using a different TTI (e.g., 1 ms TTI or an sTTI) than was used for the first data transmission at 535. For example, a first data transmission originally sent at an sTTI SPS transmission location may be retransmitted using a 1 ms TTI (e.g., after a number of retransmission attempts using sTTI SPS transmission locations). In other cases, a retransmission by UE 115-*b* to base station 105-*b* may occur after the expiration of a timer (e.g., a HARQ RTT timer).

Figure 6:
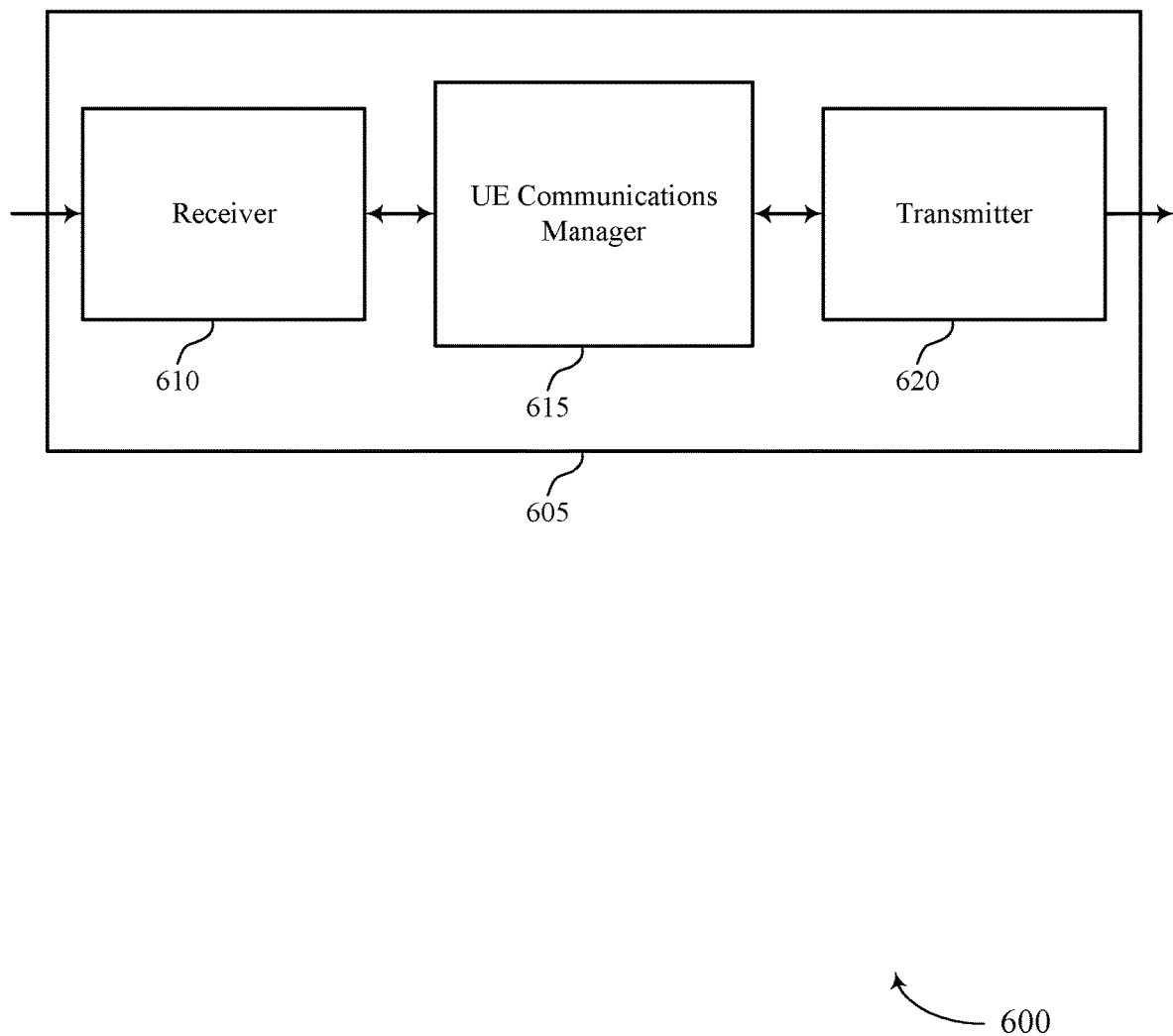
FIGS. 6 through 8 show block diagrams of a device that supports periodic grants for multiple TTI configurations in accordance with aspects of the present disclosure.

FIG. 6 shows a block diagram 600 of a wireless device 605 that supports periodic grants for multiple TTI configurations in accordance with aspects of the present disclosure. Wireless device 605 may be an example of aspects of a user equipment (UE) 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to periodic grants for multiple TTI configurations, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive a configuration for uplink transmissions, the configuration including a resource grant for respective TTIs designated for the uplink transmissions. In some cases, UE communications manager 615 may identify a first TTI in accordance with the configuration, the first TTI having a first duration, and identify, within the first TTI, a location of a second TTI in accordance with the configuration, the second TTI having a second duration that is shorter than the first duration. In some examples, UE communications manager 615 may transmit uplink data based on the identified location.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
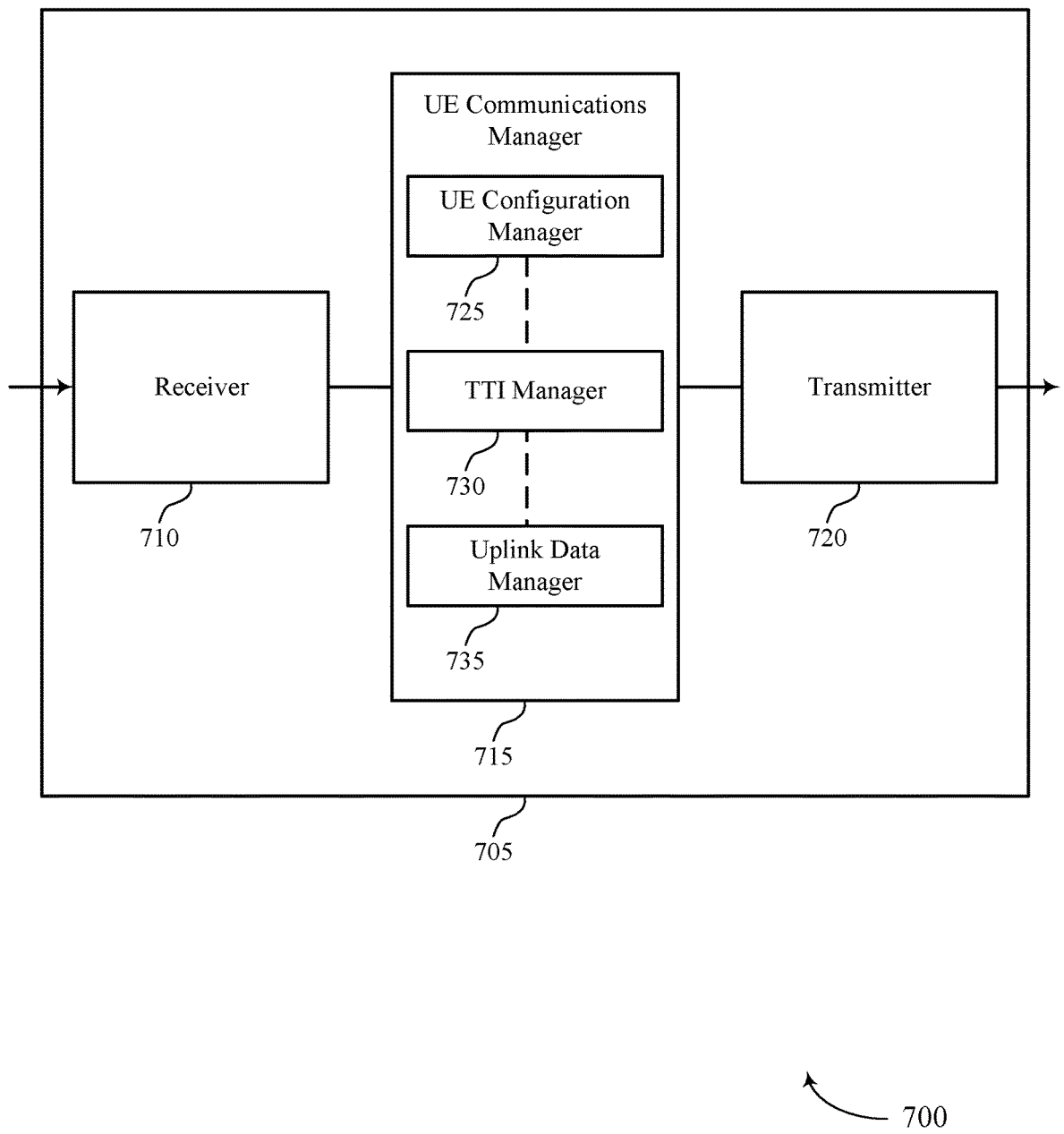

FIG. 7 shows a block diagram 700 of a wireless device 705 that supports periodic grants for multiple TTI configurations in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to periodic grants for multiple TTI configurations, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include UE configuration manager 725, TTI manager 730, and uplink data manager 735.

UE configuration manager 725 may receive a configuration for uplink transmissions, the configuration including a resource grant for respective TTIs designated for the uplink transmissions. In some cases, the periodicity includes a duration that is less than the first duration. In some examples, the configuration includes a periodicity for the respective TTIs, the respective TTIs being designated for SPS transmissions. In some cases, the periodicity includes a duration that is half of the first duration.

TTI manager 730 may identify a first TTI in accordance with the configuration, the first TTI having a first duration. In some cases, TTI manager 730 may identify a location of the first TTI in accordance with the configuration. Additionally, TTI manager 730 may identify, within the first TTI, a location of a second TTI in accordance with the configuration, the second TTI having a second duration that is shorter than the first duration. In some cases, TTI manager 730 may determine that the first TTI is available prior to the second TTI based on the identified location of the first TTI and the identified location of the second TTI. In some cases, TTI manager 730 may determine that the second TTI is available prior to the first TTI based on the identified location of the first TTI and the identified location of the second TTI. In some cases, the first duration includes one millisecond, and where the second duration includes two symbol periods, three symbol periods, or seven symbol periods.

Uplink data manager 735 may transmit uplink data based on the identified location. In some cases, uplink data manager 735 may transmit the uplink data during the first TTI or during the second TTI based on the received configuration. For example, uplink data manager 735 may determine whether to transmit the uplink data during the first TTI or during the second TTI based on the preconfigured logical channel mapping, where transmitting the uplink data is based on the determination. Additionally or alternatively, uplink data manager 735 identify a payload size of the uplink data, and determine whether to transmit the uplink data during the first TTI or during the second TTI based on the payload size, where transmitting the uplink data is based on the determination. In some examples, uplink data manager 735 may identify a latency condition associated with the uplink data, and determine whether to transmit the uplink data during the first TTI or during the second TTI based on the latency condition, where transmitting the uplink data is based on the determination. In some examples, transmitting the uplink data includes transmitting the uplink data during the first TTI or during the second TTI based on the determination of availability.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
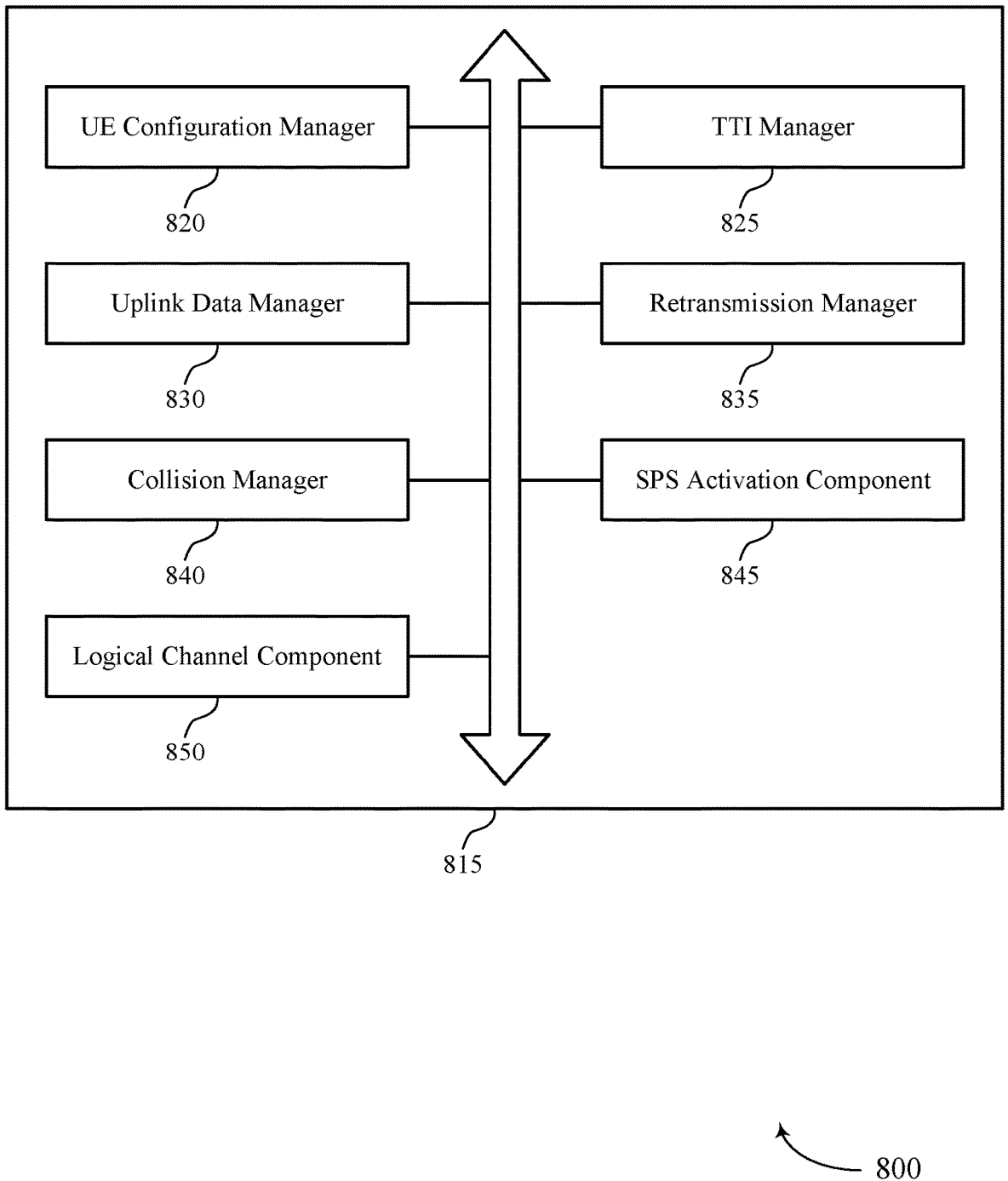

FIG. 8 shows a block diagram 800 of a UE communications manager 815 that supports periodic grants for multiple TTI configurations in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include UE configuration manager 820, TTI manager 825, uplink data manager 830, retransmission manager 835, collision manager 840, SPS activation component 845, and logical channel component 850. Each of these modules may communicate, directly or indirectly, with one another (e.g., via one or more buses).

UE configuration manager 820 may receive a configuration for uplink transmissions, the configuration including a resource grant for respective TTIs designated for the uplink transmissions. In some examples, the configuration includes a periodicity for the respective TTIs, the respective TTIs being designated for SPS transmissions. In some cases, the periodicity includes a duration that is less than the first duration. In some cases, the periodicity includes a duration that is half of the first duration. In some examples, UE configuration manager 820 may receive a second configuration for the location of a second TTI, where the location of the second TTI is dynamically configured.

TTI manager 825 may identify a first TTI in accordance with the configuration, the first TTI having a first duration. In some cases, TTI manager 825 may identify a location of the first TTI in accordance with the configuration. Additionally, TTI manager 825 may identify, within the first TTI, a location of a second TTI in accordance with the configuration, the second TTI having a second duration that is shorter than the first duration. In some cases, TTI manager 825 may determine that the first TTI is available prior to the second TTI based on the identified location of the first TTI and the identified location of the second TTI. In some cases, TTI manager 825 may determine that the second TTI is available prior to the first TTI based on the identified location of the first TTI and the identified location of the second TTI. In some cases, the first duration includes one millisecond, and where the second duration includes two symbol periods, three symbol periods, or seven symbol periods.

Uplink data manager 830 may transmit uplink data based on the identified location. In some cases, uplink data manager 830 may transmit the uplink data during the first TTI or during the second TTI based on the received configuration. For example, uplink data manager 830 may determine whether to transmit the uplink data during the first TTI or during the second TTI based on the preconfigured logical channel mapping, where transmitting the uplink data is based on the determination. Additionally or alternatively, uplink data manager 830 identify a payload size of the uplink data or a size of the resource grant, and determine whether to transmit the uplink data during the first TTI or during the second TTI based on the payload size, or the size of the resource grant, or a combination thereof, where transmitting the uplink data is based on the determination. In some examples, uplink data manager 830 may identify a latency condition associated with the uplink data, and determine whether to transmit the uplink data during the first TTI or during the second TTI based on the latency condition, where transmitting the uplink data is based on the determination. In some examples, transmitting the uplink data includes transmitting the uplink data during the first TTI or during the second TTI based on the determination of availability.

Retransmission manager 835 may receive HARQ feedback for the transmitted uplink data and retransmit the uplink data during a third TTI that follows the second TTI in accordance with the configuration, the retransmission responsive to the received HARQ feedback. In some examples, retransmission manager 835 may determine that a timer has expired and retransmit the uplink data based at on the expiration of the timer. In some examples, retransmission manager 835 may retransmit the uplink data during a third TTI that immediately follows the transmission of the uplink data in accordance with the configuration, the retransmission responsive to the received HARQ feedback. In some cases, the uplink data is retransmitted using a same RV as the transmission of the uplink data in the second TTI. In some cases, the uplink data is retransmitted using a predetermined incremental version. In some cases, the transmission of the uplink data is during the first TTI and the third TTI has the second duration. In some cases, the transmission of the uplink data is during the second TTI and the third TTI has the first duration.

Collision manager 840 may determine a priority associated with transmissions during the second TTI based on the received configuration and identify a collision between concurrent uplink transmissions, the concurrent uplink transmissions including the uplink data transmission during the second TTI and a second uplink data transmission during a third TTI having the first duration. In such cases, collision manager 840 may drop the second uplink data transmission based on the priority. In some cases, collision manager 840 may determine a priority for retransmissions based on the received configuration, and identify a collision between concurrent uplink transmissions, the concurrent uplink transmissions including a retransmission of the uplink data and a second uplink data transmission during a third TTI. In such cases, collision manager 840 may drop the second uplink data transmission based on the priority. In some cases, determining the priority includes determining a highest priority for transmissions during TTIs having the second duration. Additionally or alternatively, determining the priority may include determining a highest priority for retransmissions during TTIs having the second duration. In other examples, determining the priority may include identifying a channel priority for one or more logical channels transmitted on the respective TTIs, identifying a channel latency condition for the one or more logical channels transmitted on the respective TTIs, and determining the priority based on the identified channel priority, or the identified channel latency condition, or any combination thereof.

SPS activation component 845 may receive an indication to activate the SPS transmissions or to deactivate the SPS transmissions and transmit a confirmation of activation of the SPS transmissions or deactivation of the SPS transmissions, where the confirmation is transmitted during a temporally first TTI of the TTIs. Logical channel component 850 may identify a preconfigured logical channel mapping for the SPS transmissions.

Figure 9:
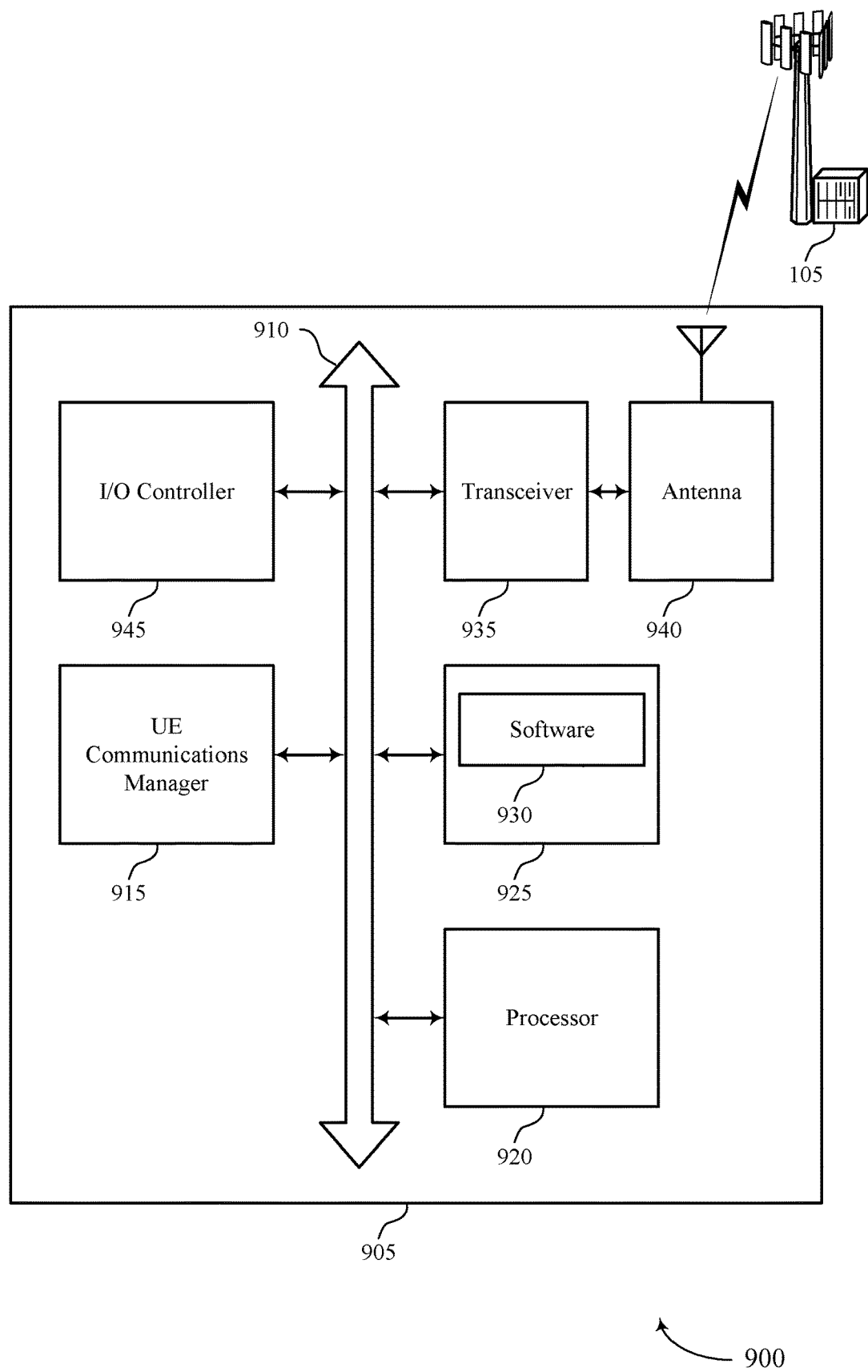
FIG. 9 illustrates a block diagram of a system including a user equipment (UE) that supports periodic grants for multiple TTI configurations in accordance with aspects of the present disclosure.

FIG. 9 shows a diagram of a system 900 including a device 905 that supports periodic grants for multiple TTI configurations in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting periodic grants for multiple TTI configurations).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support periodic grants for multiple TTI configurations. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
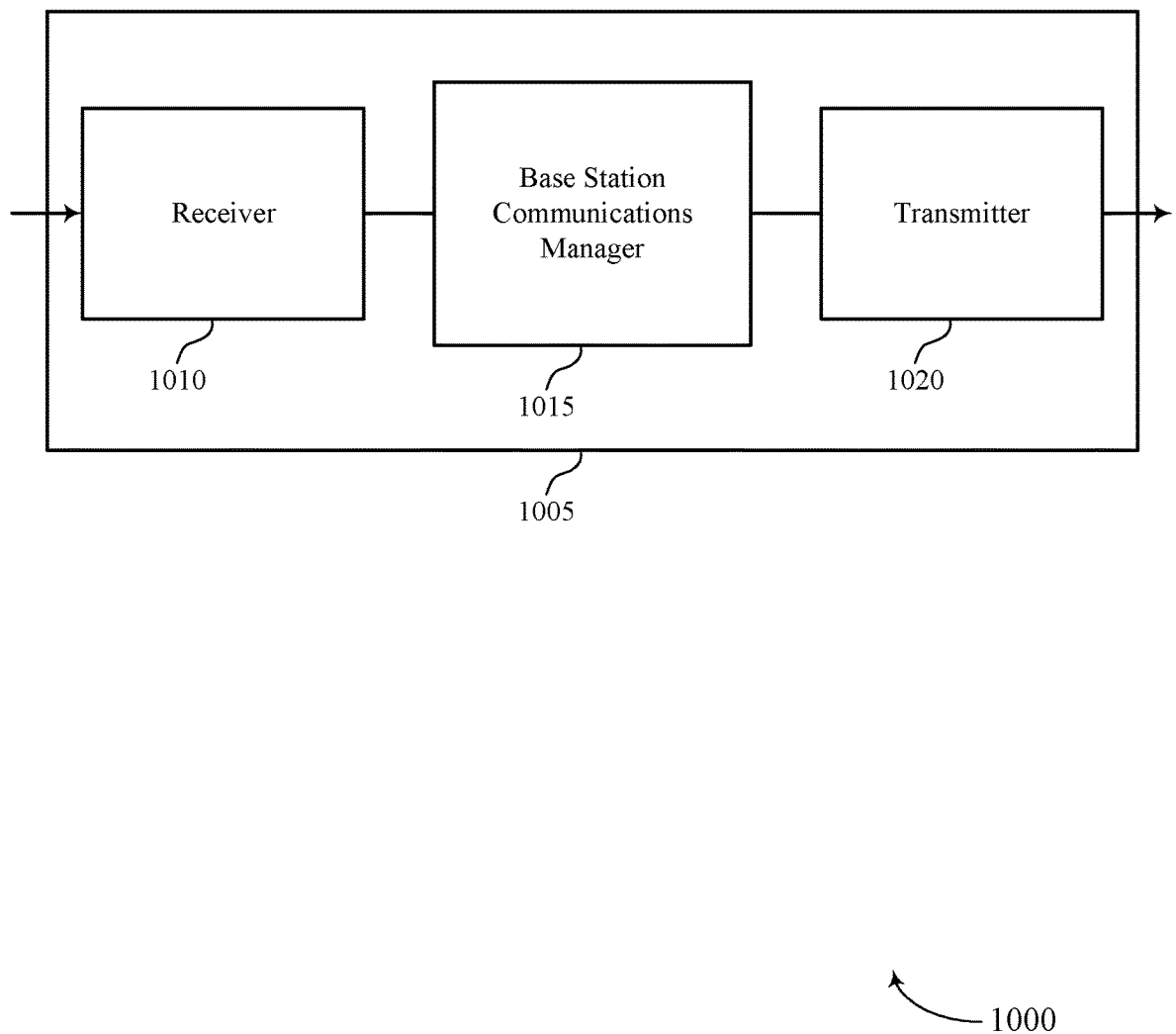
FIGS. 10 through 12 show block diagrams of a device that supports periodic grants for multiple TTI configurations in accordance with aspects of the present disclosure.

FIG. 10 shows a block diagram 1000 of a wireless device 1005 that supports periodic grants for multiple TTI configurations in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to periodic grants for multiple TTI configurations, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may configure a resource grant for uplink transmissions including a set of TTIs designated for the uplink transmissions, where the TTIs include one or more first TTIs each having a first duration and one or more second TTIs, each of the one of more second TTIs having a second duration that is shorter than the first duration. In some cases, base station communications manager 1015 may transmit signaling that indicates the uplink transmission configuration to a UE 115, and receive uplink data from the UE 115 based on the resource grant.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
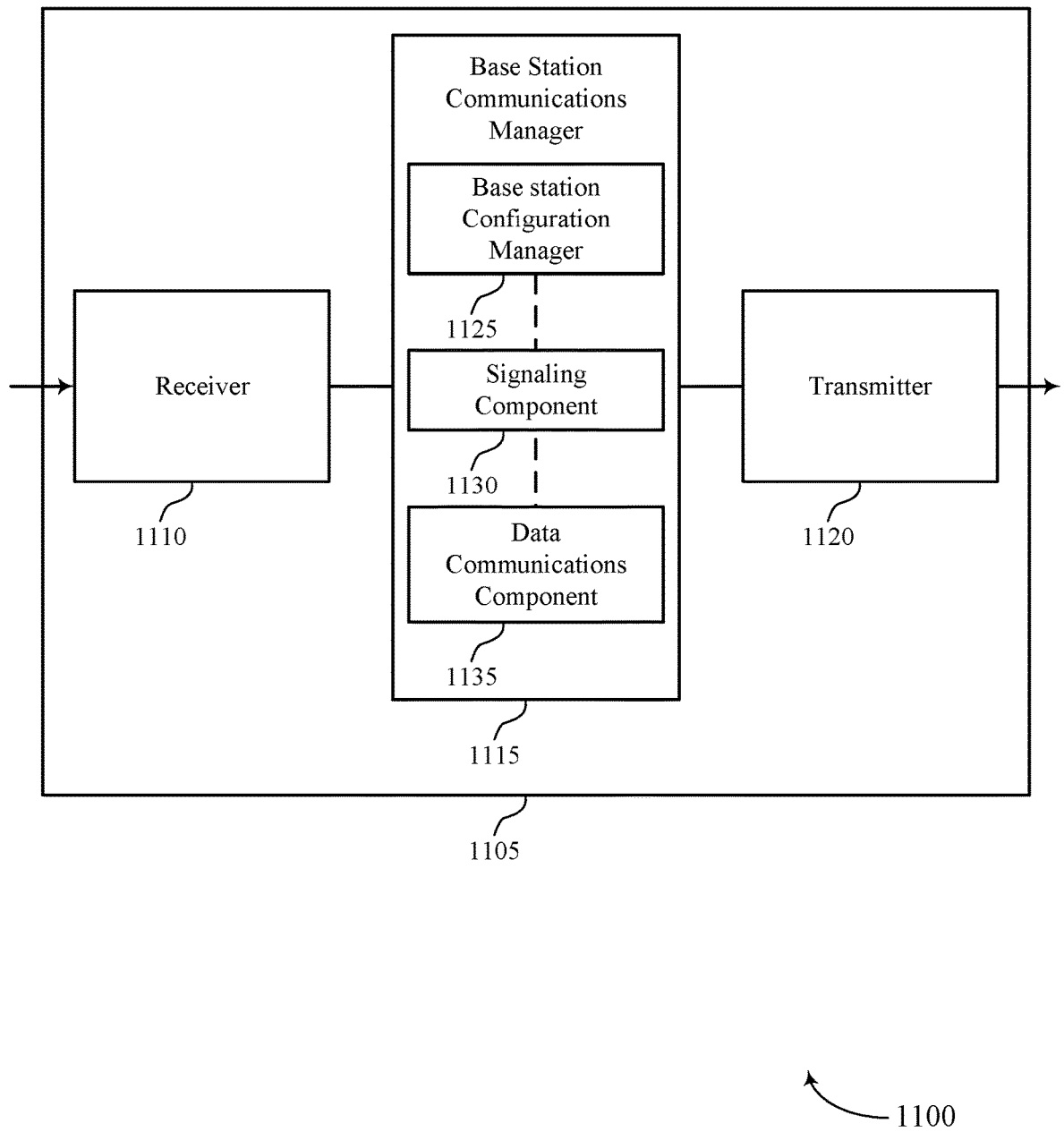

FIG. 11 shows a block diagram 1100 of a wireless device 1105 that supports periodic grants for multiple TTI configurations in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to periodic grants for multiple TTI configurations, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include base station configuration manager 1125, signaling component 1130, and data communications component 1135.

Base station configuration manager 1125 configure a resource grant for uplink transmissions including a set of TTIs designated for the uplink transmissions, where the TTIs include one or more first TTIs that each may have a first duration and one or more second TTIs, where each of the one of more second TTIs may have a second duration that is shorter than the first duration. In some examples, the configuration includes a periodicity for respective TTIs of the set of TTIs, the respective TTIs being designated for SPS transmissions. In some cases, the periodicity includes a duration that is less than the first duration. For example, the periodicity may include a duration that is half of the first duration. In some cases, the first duration includes one millisecond and the second duration includes two symbol periods, three symbol periods, or seven symbol periods. Signaling component 1130 may transmit signaling that indicates the SPS transmission configuration to a UE 115. Data communications component 1135 may receive uplink data from the UE 115 based on the periodicity.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
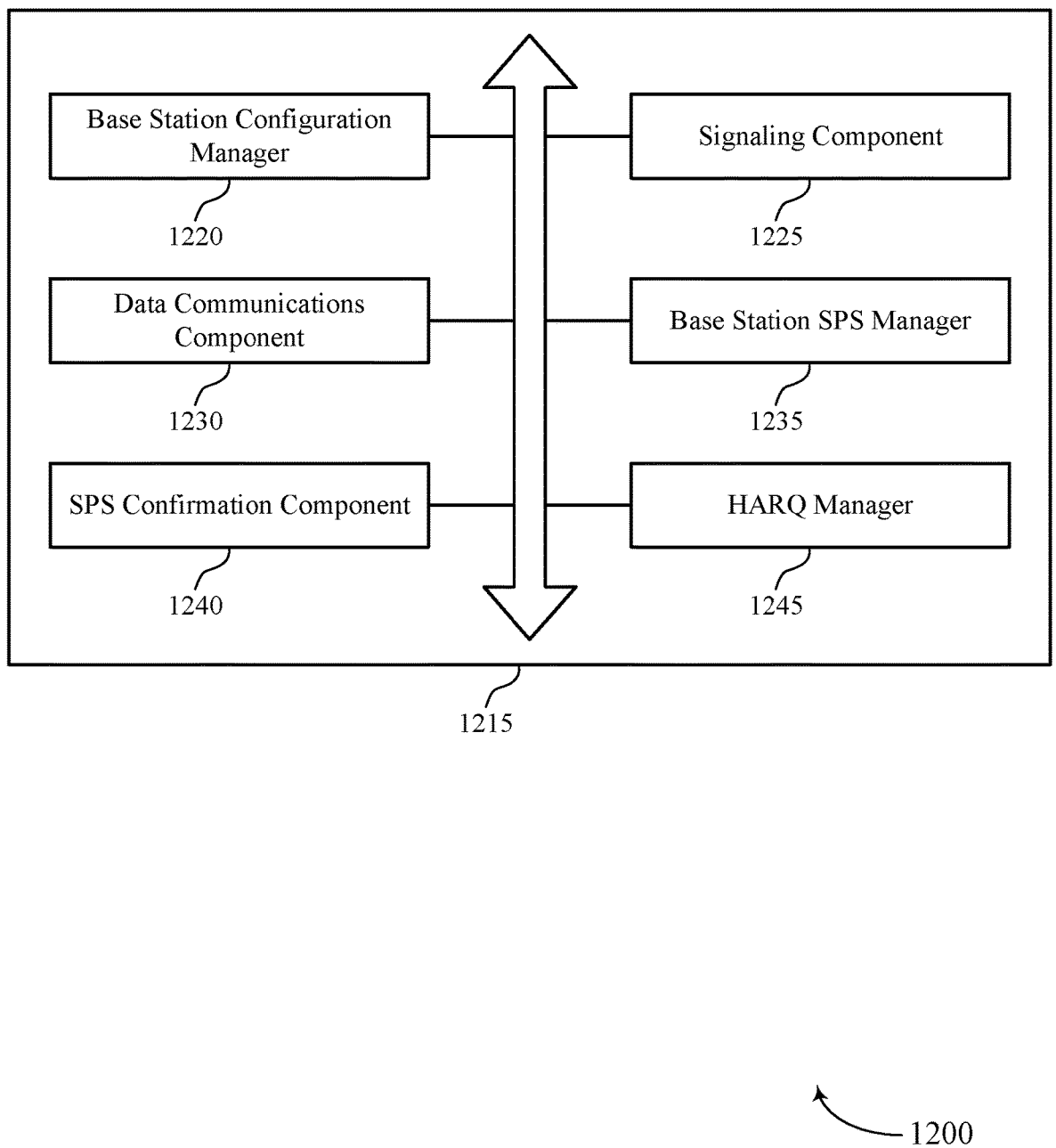

FIG. 12 shows a block diagram 1200 of a base station communications manager 1215 that supports periodic grants for multiple TTI configurations in accordance with aspects of the present disclosure. The base station communications manager 1215 may be an example of aspects of a base station communications manager 1315 described with reference to FIGS. 10, 11, and 13. The base station communications manager 1215 may include base station configuration manager 1220, signaling component 1225, data communications component 1230, base station SPS manager 1235, SPS confirmation component 1240, and HARQ manager 1245. Each of these modules may communicate, directly or indirectly, with one another (e.g., via one or more buses).

Base station configuration manager 1220 may configure a resource grant for uplink transmissions including a set of TTIs designated for the uplink transmissions, where the TTIs include one or more first TTIs each having a first duration and one or more second TTIs, each of the one of more second TTIs having a second duration that is shorter than the first duration. In some examples, the configuration includes a periodicity for respective TTIs of the set of TTIs, the respective TTIs being designated for SPS transmissions. In some cases, the periodicity includes a duration that is less than the first duration. In some cases, the periodicity includes a duration that is half of the first duration. In some cases, the first duration includes one millisecond, and where the second duration includes two symbol periods, three symbol periods, or seven symbol periods.

Signaling component 1225 may transmit signaling that indicates the SPS transmission configuration to a UE 115. Data communications component 1230 may receive uplink data from the UE 115 based on the periodicity. Base station SPS manager 1235 may transmit an indication to activate the SPS transmissions or to deactivate the SPS transmissions.

SPS confirmation component 1240 may receive, from the UE 115, a confirmation of activation of the SPS transmissions or deactivation of the SPS transmissions, where the confirmation is received on a temporally first TTI in accordance with the periodicity.

HARQ manager 1245 may transmit HARQ feedback responsive to the received uplink data and receive a retransmission of the uplink data during a third TTI, the third TTI immediately following the transmitted HARQ feedback in accordance with the configuration. In some cases, the retransmitted uplink data includes a same RV as the received uplink data. In some cases, the retransmitted uplink data includes a predetermined incremental version.

Figure 13:
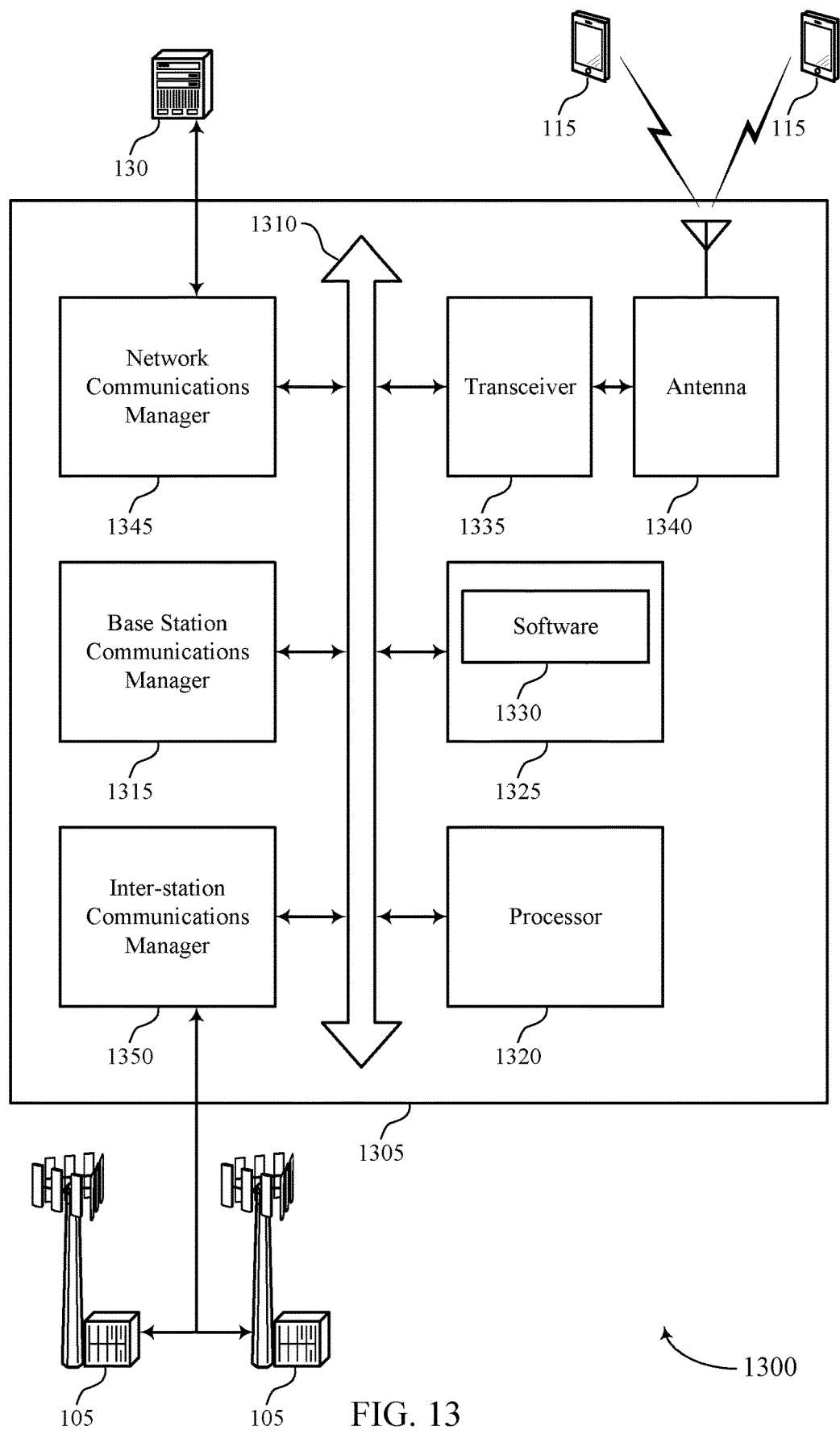
FIG. 13 illustrates a block diagram of a system including a base station that supports periodic grants for multiple TTI configurations in accordance with aspects of the present disclosure.

FIG. 13 shows a diagram of a system 1300 including a device 1305 that supports periodic grants for multiple TTI configurations in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting periodic grants for multiple TTI configurations).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support periodic grants for multiple TTI configurations. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
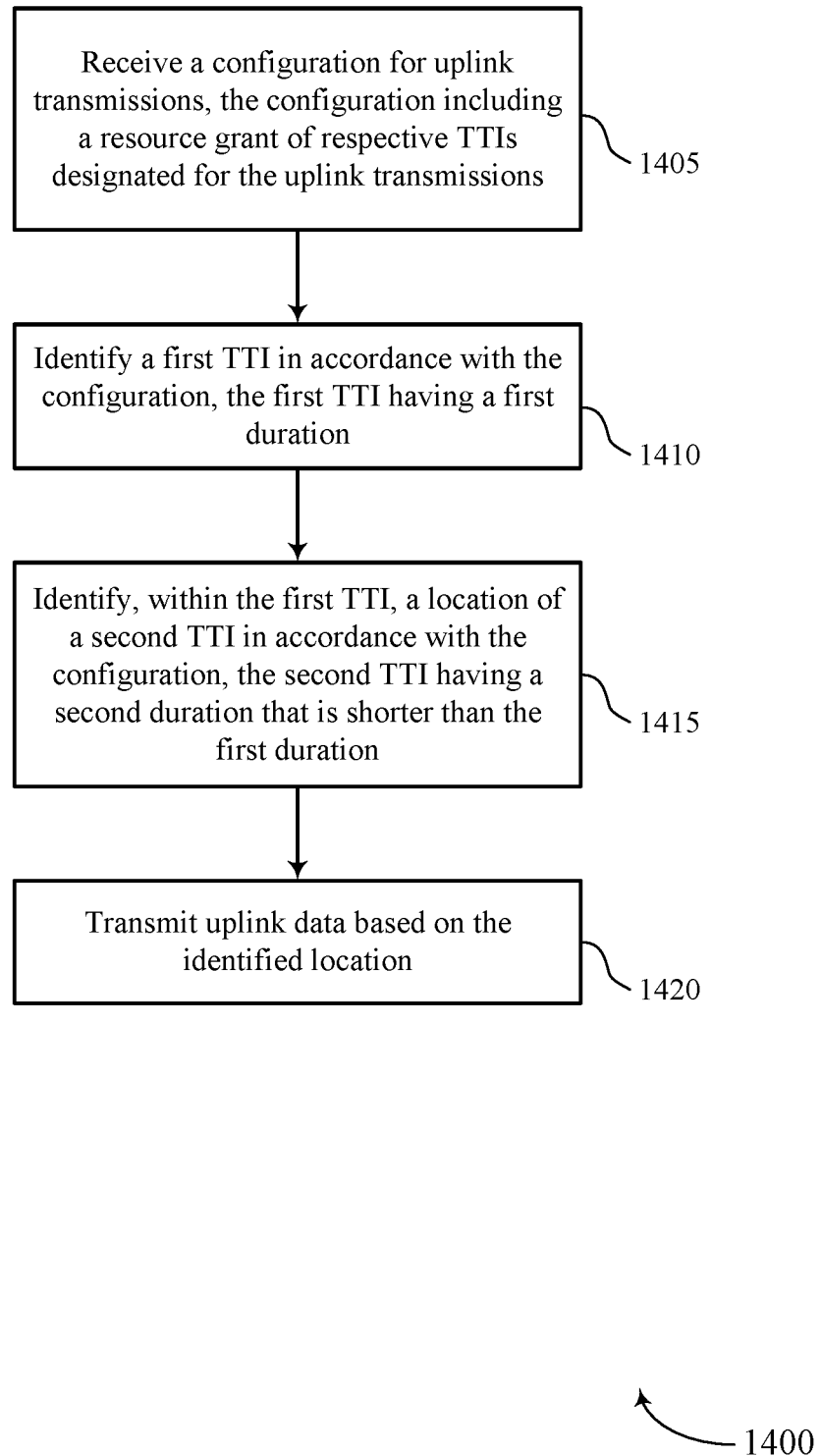
FIGS. 14 through 19 illustrate methods for periodic grants for multiple TTI configurations in accordance with aspects of the present disclosure.

FIG. 14 shows a flowchart illustrating a method 1400 for periodic grants for multiple TTI configurations in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive a configuration for uplink transmissions, the configuration comprising a periodicity of respective TTIs designated for the uplink transmissions. The operations of 1405 may be performed according to the methods described herein. In certain examples, aspects of the operations of 1405 may be performed by a UE configuration manager as described with reference to FIGS. 6 through 9.

At 1410 the UE 115 may identify a first TTI in accordance with the configuration, the first TTI having a first duration. The operations of 1410 may be performed according to the methods described herein. In certain examples, aspects of the operations of 1410 may be performed by a TTI manager as described with reference to FIGS. 6 through 9.

At 1415 the UE 115 may identify, within the first TTI, a location of a second TTI in accordance with the configuration, the second TTI having a second duration that is shorter than the first duration. The operations of 1415 may be performed according to the methods described herein. In certain examples, aspects of the operations of 1415 may be performed by a TTI manager as described with reference to FIGS. 6 through 9.

At 1420 the UE 115 may transmit uplink data based on the identified location. The operations of 1420 may be performed according to the methods described herein. In certain examples, aspects of the operations of 1420 may be performed by a uplink data manager as described with reference to FIGS. 6 through 9.

Figure 15:
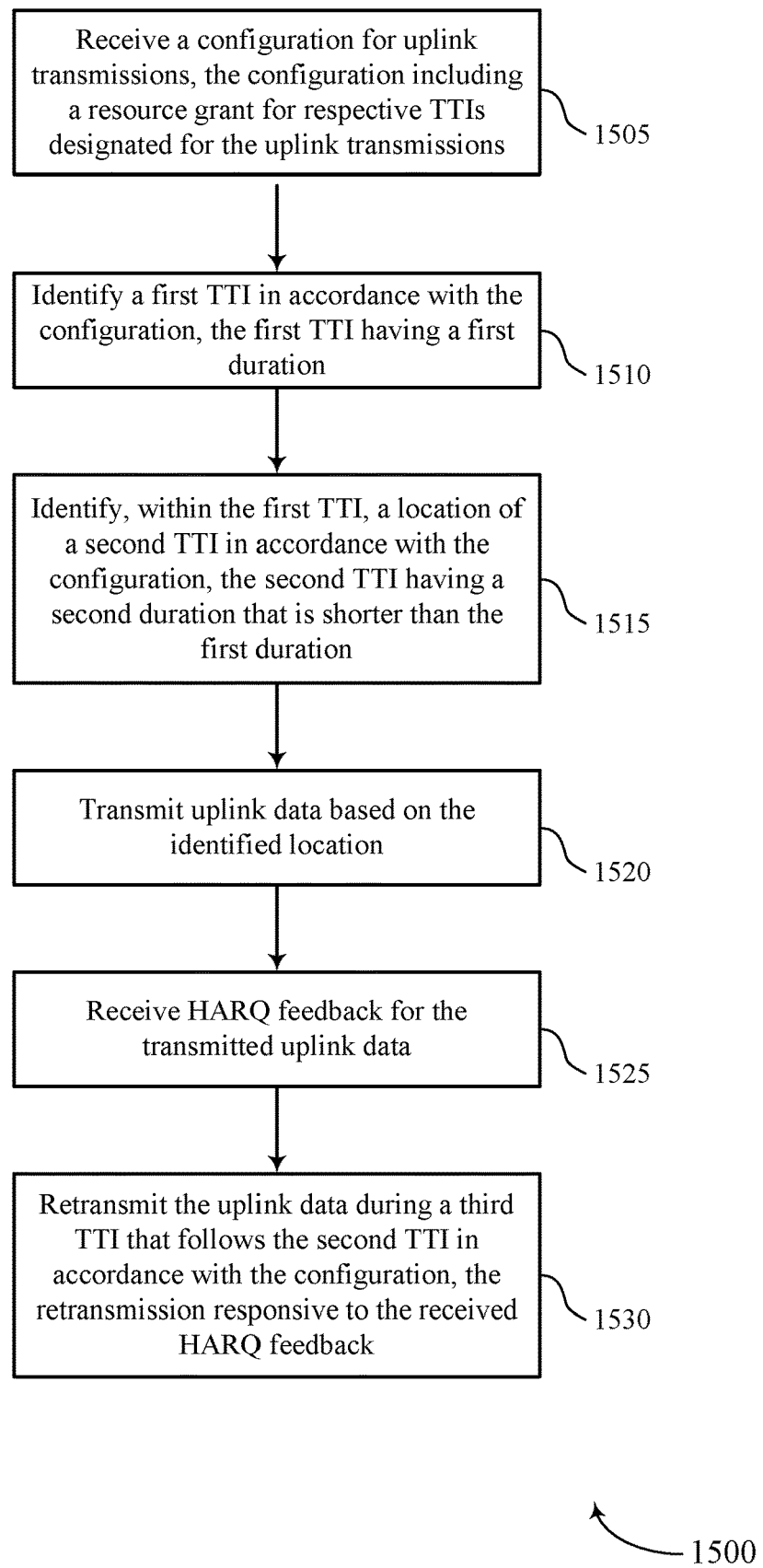

FIG. 15 shows a flowchart illustrating a method 1500 for periodic grants for multiple TTI configurations in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive a configuration for uplink transmissions, the configuration comprising a periodicity of respective TTIs designated for the uplink transmissions. The operations of 1505 may be performed according to the methods described herein. In certain examples, aspects of the operations of 1505 may be performed by a UE configuration manager as described with reference to FIGS. 6 through 9.

At 1510 the UE 115 may identify a first TTI in accordance with the configuration, the first TTI having a first duration. The operations of 1510 may be performed according to the methods described herein. In certain examples, aspects of the operations of 1510 may be performed by a TTI manager as described with reference to FIGS. 6 through 9.

At 1515 the UE 115 may identify, within the first TTI, a location of a second TTI in accordance with the configuration, the second TTI having a second duration that is shorter than the first duration. The operations of 1515 may be performed according to the methods described herein. In certain examples, aspects of the operations of 1515 may be performed by a TTI manager as described with reference to FIGS. 6 through 9.

At 1520 the UE 115 may transmit uplink data based on the identified location. The operations of 1520 may be performed according to the methods described herein. In certain examples, aspects of the operations of 1520 may be performed by a uplink data manager as described with reference to FIGS. 6 through 9.

At 1525 the UE 115 may receive HARQ feedback for the transmitted uplink data. The operations of 1525 may be performed according to the methods described herein. In certain examples, aspects of the operations of 1525 may be performed by a retransmission manager as described with reference to FIGS. 6 through 9.

At 1530 the UE 115 may retransmit the uplink data during a third TTI that follows the second TTI in accordance with the configuration, the retransmission responsive to the received HARQ feedback. The operations of 1530 may be performed according to the methods described herein. In certain examples, aspects of the operations of 1530 may be performed by a retransmission manager as described with reference to FIGS. 6 through 9.

Figure 16:
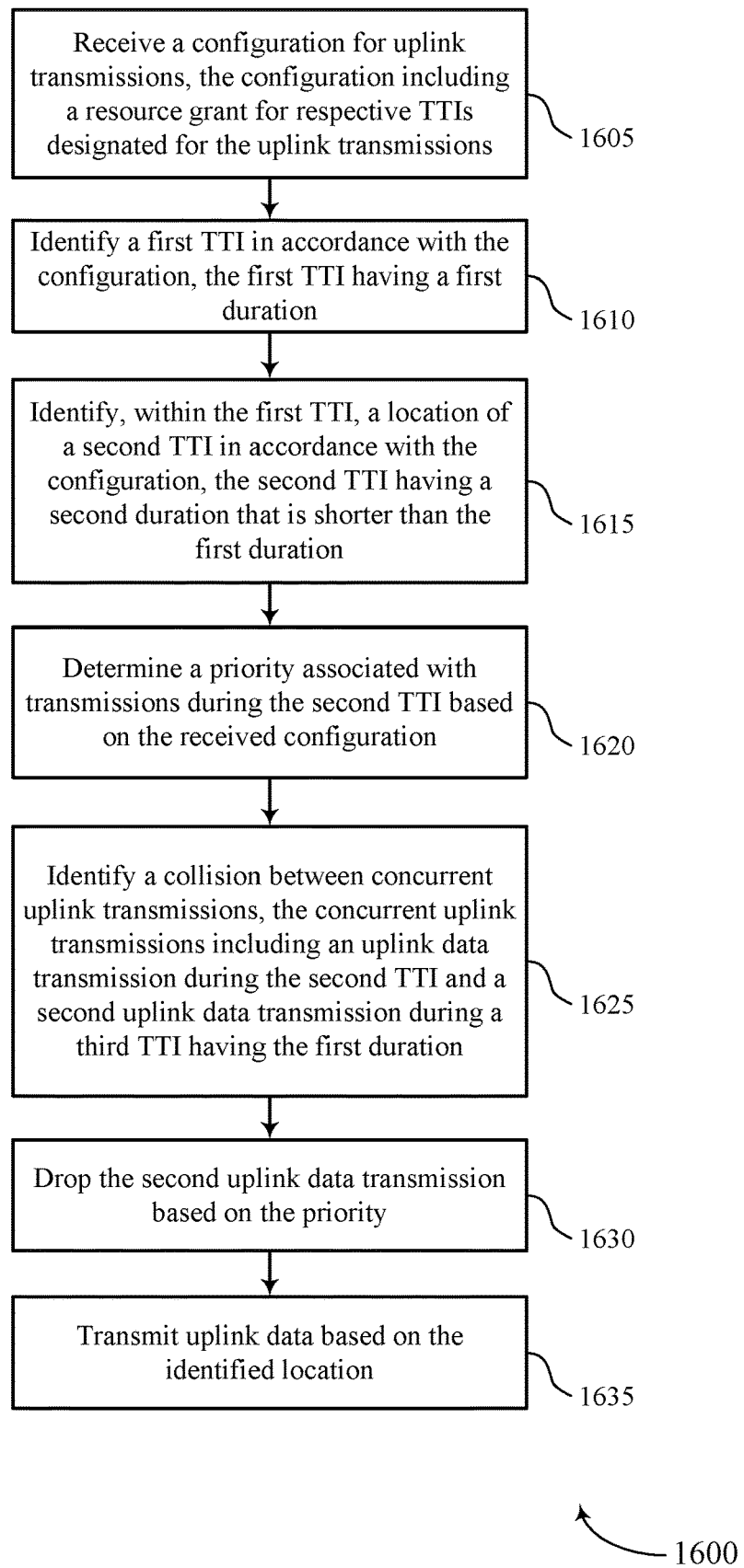

FIG. 16 shows a flowchart illustrating a method 1600 for periodic grants for multiple TTI configurations in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive a configuration for uplink transmissions, the configuration comprising a periodicity of respective TTIs designated for the uplink transmissions. The operations of 1605 may be performed according to the methods described herein. In certain examples, aspects of the operations of 1605 may be performed by a UE configuration manager as described with reference to FIGS. 6 through 9.

At 1610 the UE 115 may identify a first TTI in accordance with the configuration, the first TTI having a first duration. The operations of 1610 may be performed according to the methods described herein. In certain examples, aspects of the operations of 1610 may be performed by a TTI manager as described with reference to FIGS. 6 through 9.

At 1615 the UE 115 may identify, within the first TTI, a location of a second TTI in accordance with the configuration, the second TTI having a second duration that is shorter than the first duration. The operations of 1615 may be performed according to the methods described herein. In certain examples, aspects of the operations of 1615 may be performed by a TTI manager as described with reference to FIGS. 6 through 9.

At 1620 the UE 115 may determine a priority associated with transmissions during the second TTI based on the received configuration. The operations of 1620 may be performed according to the methods described herein. In certain examples, aspects of the operations of 1620 may be performed by a collision manager as described with reference to FIGS. 6 through 9.

At 1625 the UE 115 may identify a collision between concurrent uplink transmissions, the concurrent uplink transmissions comprising the uplink data transmission during the second TTI and a second uplink data transmission during a third TTI having the first duration. The operations of 1625 may be performed according to the methods described herein. In certain examples, aspects of the operations of 1625 may be performed by a collision manager as described with reference to FIGS. 6 through 9.

At 1630 the UE 115 may drop the second uplink data transmission based on the priority. The operations of 1630 may be performed according to the methods described herein. In certain examples, aspects of the operations of 1630 may be performed by a collision manager as described with reference to FIGS. 6 through 9.

At 1635 the UE 115 may transmit uplink data based on the identified location. The operations of 1635 may be performed according to the methods described herein. In certain examples, aspects of the operations of 1635 may be performed by a uplink data manager as described with reference to FIGS. 6 through 9.

Figure 17:
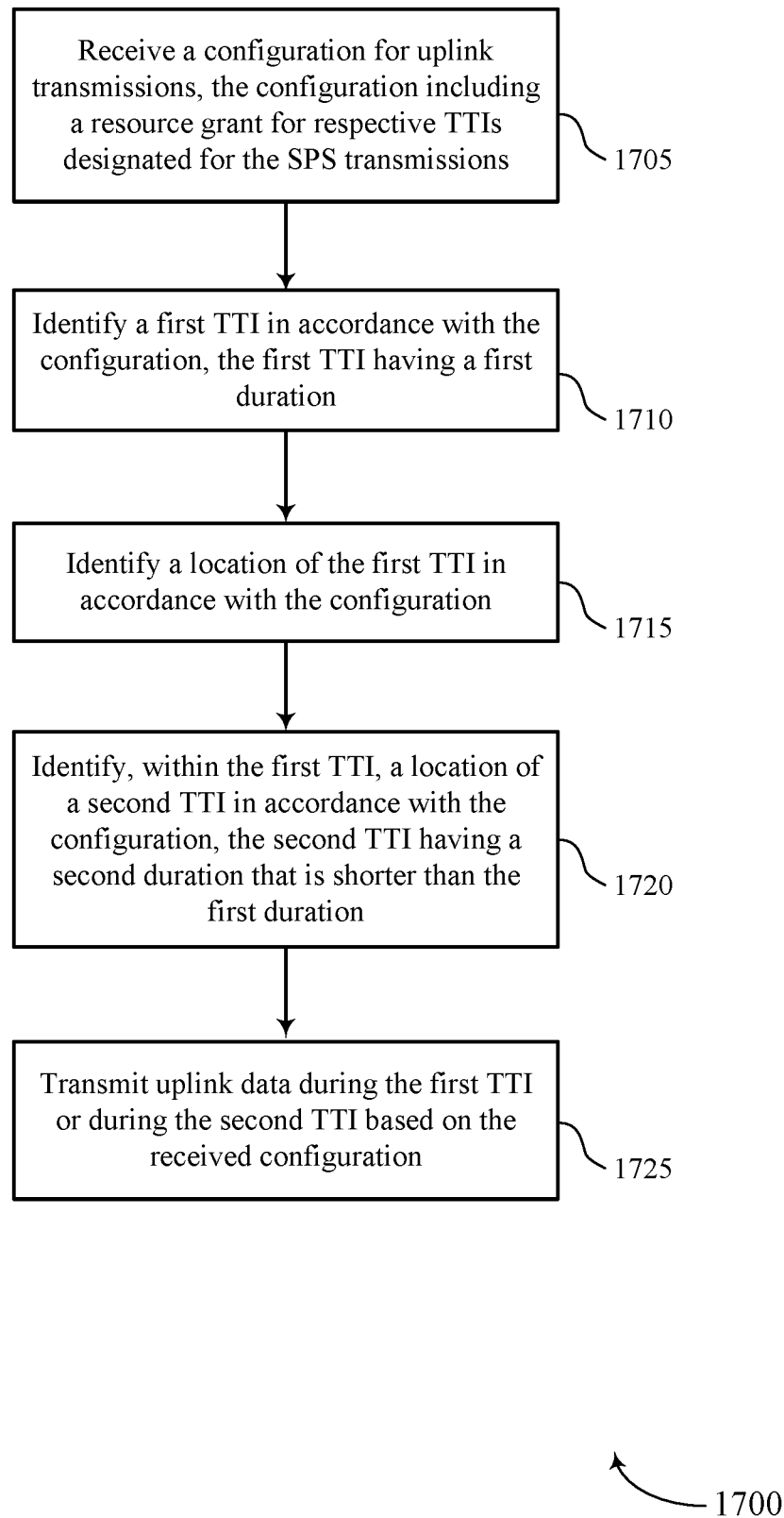

FIG. 17 shows a flowchart illustrating a method 1700 for periodic grants for multiple TTI configurations in accordance with aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive a configuration for uplink transmissions, the configuration comprising a periodicity of respective TTIs designated for the uplink transmissions. The operations of 1705 may be performed according to the methods described herein. In certain examples, aspects of the operations of 1705 may be performed by a UE configuration manager as described with reference to FIGS. 6 through 9.

At 1710 the UE 115 may identify a first TTI in accordance with the configuration, the first TTI having a first duration.

The operations of 1710 may be performed according to the methods described herein. In certain examples, aspects of the operations of 1710 may be performed by a TTI manager as described with reference to FIGS. 6 through 9.

At 1715 the UE 115 may identify a location of the first TTI in accordance with the configuration. The operations of 1715 may be performed according to the methods described herein. In certain examples, aspects of the operations of 1715 may be performed by a TTI manager as described with reference to FIGS. 6 through 9.

At 1720 the UE 115 may identify, within the first TTI, a location of a second TTI in accordance with the configuration, the second TTI having a second duration that is shorter than the first duration. The operations of 1720 may be performed according to the methods described herein. In certain examples, aspects of the operations of 1720 may be performed by a TTI manager as described with reference to FIGS. 6 through 9.

At 1725 the UE 115 may transmit uplink data during the first TTI or during the second TTI based on the received configuration. The operations of 1725 may be performed according to the methods described herein. In certain examples, aspects of the operations of 1725 may be performed by a uplink data manager as described with reference to FIGS. 6 through 9.

Figure 18:
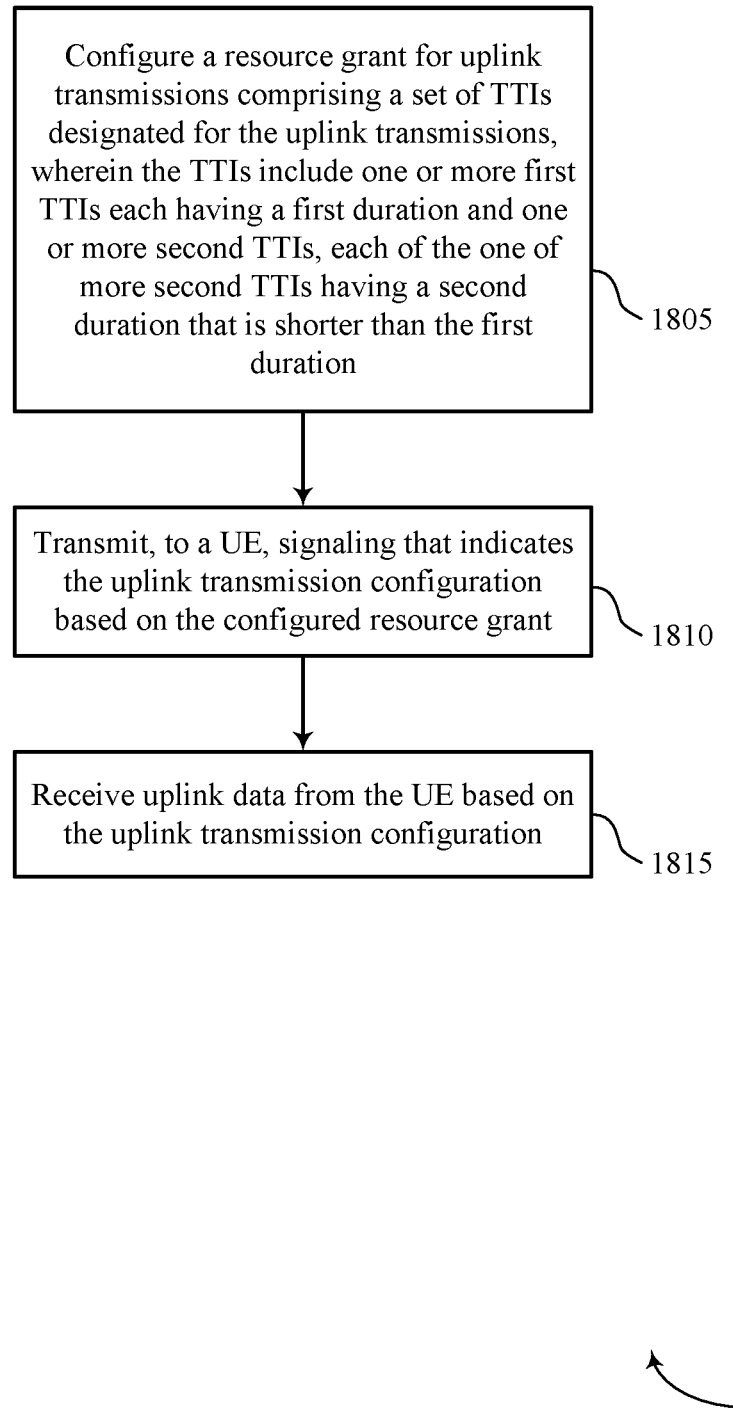

FIG. 18 shows a flowchart illustrating a method 1800 for periodic grants for multiple TTI configurations in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may configure a resource grant for uplink transmissions comprising a set of TTIs designated for the uplink transmissions, wherein the TTIs include one or more first TTIs each having a first duration and one or more second TTIs, each of the one of more second TTIs having a second duration that is shorter than the first duration. The operations of 1805 may be performed according to the methods described herein. In certain examples, aspects of the operations of 1805 may be performed by a base station configuration manager as described with reference to FIGS. 10 through 13.

At 1810 the base station 105 may transmit, to a UE 115, signaling that indicates the uplink transmission configuration based on the configured resource grant. The operations of 1810 may be performed according to the methods described herein. In certain examples, aspects of the operations of 1810 may be performed by a signaling component as described with reference to FIGS. 10 through 13.

At 1815 the base station 105 may receive uplink data from the UE 115 based on the uplink transmission configuration. The operations of 1815 may be performed according to the methods described herein. In certain examples, aspects of the operations of 1815 may be performed by a data communications component as described with reference to FIGS. 10 through 13.

Figure 19:
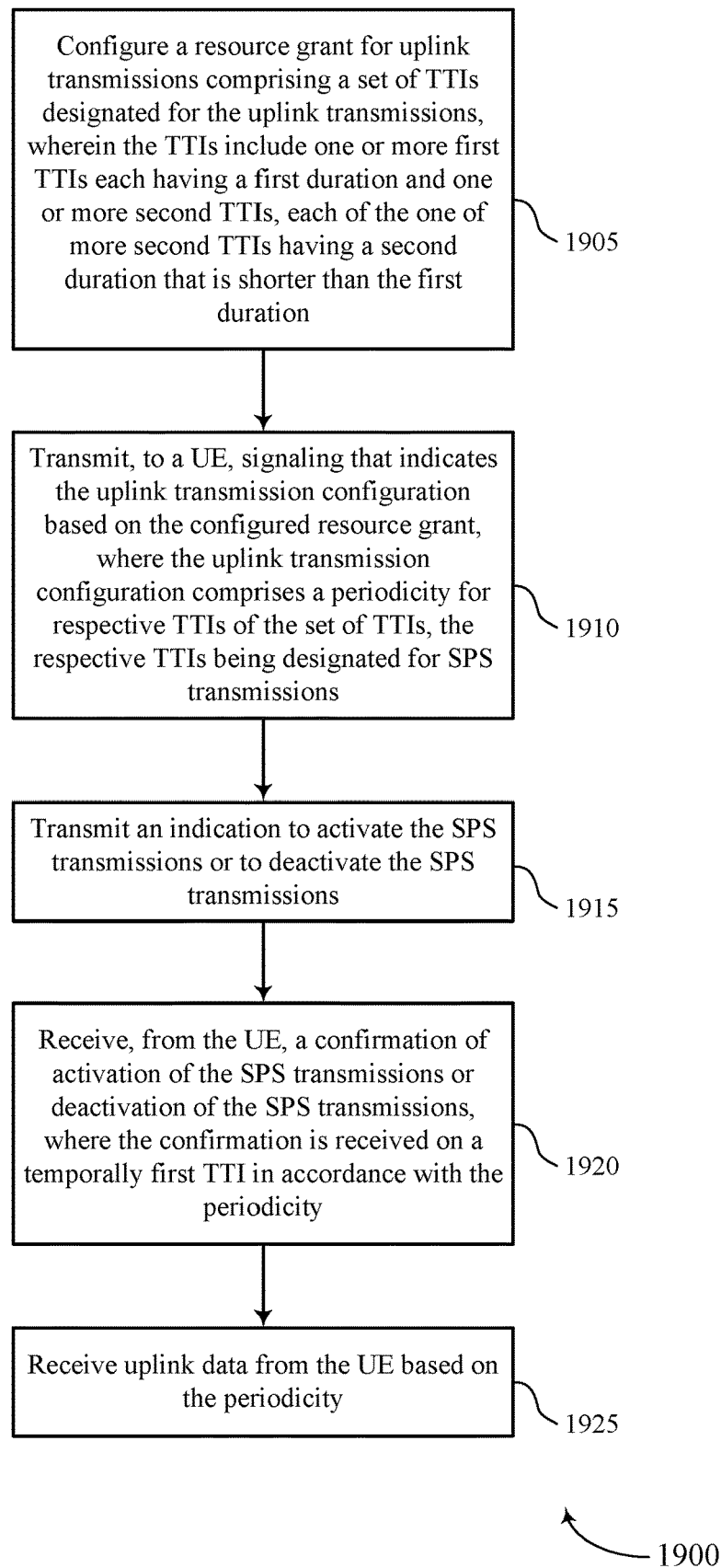

FIG. 19 shows a flowchart illustrating a method 1900 for periodic grants for multiple TTI configurations in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may configure a resource grant for uplink transmissions comprising a set of TTIs designated for the uplink transmissions, wherein the TTIs include one or more first TTIs each having a first duration and one or more second TTIs, each of the one of more second TTIs having a second duration that is shorter than the first duration. The operations of 1905 may be performed according to the methods described herein. In certain examples, aspects of the operations of 1905 may be performed by a base station configuration manager as described with reference to FIGS. 10 through 13.

At 1910 the base station 105 may transmit signaling, to a UE 115, that indicates the uplink transmission configuration based on the configured resource grant, where the uplink transmission configuration comprises a periodicity for respective TTIs of the set of TTIs, the respective TTIs being designated for SPS transmissions. The operations of 1910 may be performed according to the methods described herein. In certain examples, aspects of the operations of 1910 may be performed by a signaling component as described with reference to FIGS. 10 through 13.

At 1915 the base station 105 may transmit an indication to activate the SPS transmissions or to deactivate the SPS transmissions. The operations of 1915 may be performed according to the methods described herein. In certain examples, aspects of the operations of 1915 may be performed by a base station SPS manager as described with reference to FIGS. 10 through 13.

At 1920 the base station 105 may receive, from the UE 115, a confirmation of activation of the SPS transmissions or deactivation of the SPS transmissions, wherein the confirmation is received on a temporally first TTI in accordance with the configuration. The operations of 1920 may be performed according to the methods described herein. In certain examples, aspects of the operations of 1920 may be performed by a SPS confirmation component as described with reference to FIGS. 10 through 13.

At 1925 the base station 105 may receive uplink data from the UE 115 based on the periodicity. The operations of 1925 may be performed according to the methods described herein. In certain examples, aspects of the operations of 1925 may be performed by a data communications component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a configuration for uplink transmissions, the configuration comprising a resource grant including a periodicity for respective transmission time intervals (TTIs), the respective TTIs being designated for the uplink transmissions;
   identifying a first TTI in accordance with the configuration, the first TTI having a first duration;
   identifying, within the first TTI, a location of a second TTI in accordance with the configuration, the second TTI having a second duration that is shorter than the first duration;
   transmitting a first uplink data transmission during the second TTI or during the first TTI in accordance with the configuration;
   determining a priority for retransmissions based at least in part on the received configuration and a TTI duration;
   identifying a collision between concurrent uplink transmissions, the concurrent uplink transmissions comprising a retransmission of the first uplink data and a second uplink data transmission during a third TTI; and
   dropping the second uplink data transmission based at least in part on the priority.

2. The method of claim 1, further comprising:
   receiving hybrid automatic repeat request (HARQ) feedback for the first uplink data transmission; and
   retransmitting the first uplink data during the third TTI following the second TTI in accordance with the configuration, the retransmitting responsive to the received HARQ feedback.

3. The method of claim 2, wherein the first uplink data is retransmitted using a same redundancy version (RV) as a transmission of the uplink data in the second TTI.

4. The method of claim 2, wherein the first uplink data is retransmitted using a predetermined incremental version.

5. The method of claim 2, further comprising:
   determining that a timer has expired; and
   retransmitting the first uplink data based at on the expiration of the timer.

6. The method of claim 1, further comprising:
   determining a priority associated with transmissions during the second TTI based at least in part on the received configuration;
   identifying a collision between concurrent uplink transmissions, the concurrent uplink transmissions comprising the first uplink data transmission during the second TTI and a second uplink data transmission during a third TTI having the first duration; and
   dropping the second uplink data transmission based at least in part on the priority.

7. The method of claim 1, wherein the determining the priority comprises:
   determining a highest priority for transmissions during TTIs having the second duration.

8. The method of claim 1, wherein the determining the priority comprises:
   determining a highest priority for retransmissions during TTIs having the second duration.

9. The method of claim 1, wherein determining the priority comprises:
   identifying a channel priority for one or more logical channels transmitted on the first TTI and the second TTI;

identifying a channel latency condition for the one or more logical channels transmitted on the first TTI and the second TTI; and determining the priority based at least in part on the identified channel priority, or the identified channel latency condition, or any combination thereof.

10. The method of claim 1, wherein the first TTI and the second TTI are designated for semi-persistent scheduling (SPS) transmissions.

11. The method of claim 10, further comprising:
receiving an indication to activate the SPS transmissions or to deactivate the SPS transmissions; and
transmitting a confirmation of activation of the SPS transmissions or deactivation of the SPS transmissions, wherein the confirmation is transmitted during a temporally first TTI comprising the first TTI or the second TTI.

12. The method of claim 10, wherein the periodicity comprises a duration that is less than the first duration.

13. The method of claim 1, further comprising:
receiving a second configuration for the location of the second TTI, wherein the location of the second TTI is dynamically configured.

14. The method of claim 1, further comprising:
identifying a location of the first TTI in accordance with the configuration; and
transmitting the first uplink data during the first TTI or during the second TTI based at least in part on the received configuration.

15. The method of claim 14, further comprising:
identifying a preconfigured logical channel mapping for the uplink transmissions; and
determining whether to transmit the first uplink data during the first TTI or during the second TTI based at least in part on the preconfigured logical channel mapping, wherein transmitting the uplink data is based on the determination.

16. The method of claim 14, further comprising:
determining that the first TTI is available prior to the second TTI based at least in part on the identified location of the first TTI and the identified location of the second TTI, wherein transmitting the first uplink data comprises:
transmitting the first uplink data during the first TTI based on the determination.

17. The method of claim 14, further comprising:
determining that the second TTI is located within the first TTI based at least in part on the identified location of the first TTI and the identified location of the second TTI, wherein transmitting the uplink data comprises:
transmitting the first uplink data during the second TTI based on the determination.

18. The method of claim 14, further comprising:
identifying a payload size of the first uplink data, or a size of the resource grant, or a latency condition associated with the first uplink data, or a combination thereof; and
determining whether to transmit the first uplink data during the first TTI or during the second TTI based at least in part on the payload size, or the size of the resource grant, or the latency condition, or a combination thereof, wherein transmitting the first uplink data is based on the determination.

19. The method of claim 13, further comprising:
receiving hybrid automatic repeat request (HARQ) feedback for the first uplink data transmission; and
retransmitting the first uplink data during the third TTI that immediately follows a transmission of the first uplink data in accordance with the configuration, the retransmitting responsive to the received HARQ feedback.

20. The method of claim 19, wherein the transmission of the first uplink data is during the first TTI and the third TTI has the second duration or the transmission of the first uplink data is during the second TTI and the third TTI has the first duration.

21. A method for wireless communication, comprising:
configuring a resource grant for uplink transmissions comprising a periodicity for respective transmission time intervals (TTIs) of a set of TTIs, the respective TTIs designated for the uplink transmissions, wherein the TTIs include one or more first TTIs each having a first duration and one or more second TTIs, each of the one of more second TTIs having a second duration that is shorter than the first duration;

transmitting, to a user equipment (UE), signaling that indicates an uplink transmission configuration based at least in part on the configured resource grant;

determining a priority for retransmissions based at least in part on the transmitted configuration and a TTI duration;

identifying a collision between concurrent uplink transmissions, the concurrent uplink transmissions comprising a retransmission of a first uplink data transmission and a second uplink data transmission during a third TTI; and receiving, from the UE, the first uplink data transmission according to the periodicity based at least in part on the uplink transmission configuration and the second uplink data transmission being dropped.

22. The method of claim 21, wherein the one or more first TTIs and the one or more second TTIs are designated for semi-persistent scheduling (SPS) transmissions.

23. The method of claim 22, further comprising:
transmitting an indication to activate the SPS transmissions or to deactivate the SPS transmissions; and
receiving, from the UE, a confirmation of activation of the SPS transmissions or deactivation of the SPS transmissions, wherein the confirmation is received on a temporally first TTI comprising one or more first TTIs or one or more second TTIs in accordance with the periodicity.

24. The method of claim 22, wherein the periodicity comprises a duration that is less than the first duration.

25. The method of claim 21, further comprising:
transmitting hybrid automatic repeat request (HARQ) feedback responsive to the received first uplink data; and
receiving a retransmission of the first uplink data during the third TTI, the third TTI immediately following the transmitted HARQ feedback in accordance with the uplink transmission configuration.

26. The method of claim 25, wherein the retransmission of the first uplink data comprises a same redundancy version (RV) as the received uplink data.

27. The method of claim 25, wherein the retransmission of the first uplink data comprises a predetermined incremental version.

28. An apparatus for wireless communication, comprising:
- a processor;
- memory coupled with the processor; and
- instructions stored in the memory and operable, when executed by the processor, to cause the apparatus to:
  - receive a configuration for uplink transmissions, the configuration comprising a resource grant including a periodicity for respective transmission time intervals (TTIs), the respective TTIs being designated for the uplink transmissions;
  - identify a first TTI in accordance with the configuration, the first TTI having a first duration;
  - identify, within the first TTI, a location of a second TTI in accordance with the configuration, the second TTI having a second duration that is shorter than the first duration;
  - transmit a first uplink data transmission during the second TTI or during the first TTI in accordance with the configuration;
  - determine a priority for retransmissions based at least in part on the received configuration and a TTI duration;
  - identify a collision between concurrent uplink transmissions, the concurrent uplink transmissions comprising a retransmission of the first uplink data and a second uplink data transmission during a third TTI; and
  - drop the second uplink data transmission based at least in part on the priority.

29. An apparatus for wireless communication, comprising:
- a processor;
- memory in electronic communication with the processor; and
- instructions stored in the memory and operable, when executed by the processor, to cause the apparatus to:
  - configure a resource grant for uplink transmissions comprising periodicity for respective transmission time intervals (TTIs) of a set of TTIs, the respective TTIs designated for the uplink transmissions, wherein the TTIs include one or more first TTIs each having a first duration and one or more second TTIs, each of the one of more second TTIs having a second duration that is shorter than the first duration;
  - transmit, to a user equipment (UE), signaling that indicates an uplink transmission configuration based at least in part on the configured resource grant;
  - determine a priority for retransmissions based at least in part on the transmitted configuration and a TTI duration;
  - identifying a collision between concurrent uplink transmissions, the concurrent uplink transmission comprising a retransmission of a first uplink data transmission and a second uplink data transmission during a third TTI; and
  - receive, from the UE, the first uplink data transmission according to the periodicity based at least in part on the resource grant and the second uplink data transmission being dropped.

* * * * *